US009648588B2

(12) United States Patent
Kim et al.

(10) Patent No.: US 9,648,588 B2
(45) Date of Patent: May 9, 2017

(54) METHOD AND APPARATUS FOR TRANSMITTING/RECEIVING CHANNELS IN MOBILE COMMUNICATION SYSTEM SUPPORTING MASSIVE MIMO

(71) Applicant: Samsung Electronics Co. Ltd., Suwon-si, Gyeonggi-do (KR)

(72) Inventors: Younsun Kim, Seongnam-si (KR); Aris Papasakellariou, Dallas, TX (US); Kiil Kim, Yongin-si (KR); Juho Lee, Suwon-si (KR); Hyojin Lee, Suwon-si (KR); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/857,555

(22) Filed: Apr. 5, 2013

(65) Prior Publication Data
US 2013/0265955 A1 Oct. 10, 2013

Related U.S. Application Data

(60) Provisional application No. 61/621,176, filed on Apr. 6, 2012.

(51) Int. Cl.
*H04W 72/00* (2009.01)
*H04W 72/04* (2009.01)
(Continued)

(52) U.S. Cl.
CPC ........... *H04W 72/04* (2013.01); *H04L 5/0051* (2013.01); *H04L 5/0094* (2013.01); *H04W 72/02* (2013.01); *H04W 72/042* (2013.01)

(58) Field of Classification Search
USPC ................................ 370/329, 330, 334, 338
See application file for complete search history.

(56) References Cited

U.S. PATENT DOCUMENTS

| 2011/0103324 A1* | 5/2011 | Nam | ...................... H04L 5/0048 370/329 |
| 2012/0020323 A1* | 1/2012 | Noh | ........................ H04J 13/00 370/330 |

(Continued)

FOREIGN PATENT DOCUMENTS

| KR | 10-2011-0021697 A | 3/2011 |
| WO | 2011/046413 A2 | 4/2011 |

(Continued)

OTHER PUBLICATIONS

NEC Group R1-094730 3GPP TSG-RAN WG1 Meeting #59 Jeju, KOrea, Nov. 9-13, 2009.

*Primary Examiner* — Gary Mui
*Assistant Examiner* — Stephen Steiner
(74) *Attorney, Agent, or Firm* — Jefferson IP Law, LLP

(57) ABSTRACT

A channel transmission/reception method and an apparatus for transmitting/receiving channels between a base station and a mobile terminal efficiently in a mobile communication supporting massive Multiple Input Multiple Output (MIMO) transmission are provided. The method includes determining a resource to which a Demodulation Reference Signal (DMRS) addressed to a terminal is mapped within a resource block, the DMRS resource being positioned in at least one of a first resource set capable of being allocated for DMRS and a second resource set symmetric with the first resource set on a time axis, and transmitting the DMRS and DMRS allocation information to the terminal.

16 Claims, 21 Drawing Sheets

(51) Int. Cl.
*H04W 72/02* (2009.01)
*H04L 5/00* (2006.01)

(56) References Cited

U.S. PATENT DOCUMENTS

| | | |
|---|---|---|
| 2012/0134338 A1 | 5/2012 | Ko et al. |
| 2012/0163335 A1 | 6/2012 | Chung et al. |
| 2012/0207119 A1* | 8/2012 | Zhang et al. .................. 370/329 |
| 2012/0230290 A1* | 9/2012 | Seo ....................... H04L 1/0026 370/329 |
| 2013/0064216 A1* | 3/2013 | Gao et al. ..................... 370/330 |
| 2013/0070732 A1 | 3/2013 | Noh et al. |
| 2013/0265980 A1* | 10/2013 | Zhu et al. ..................... 370/329 |

FOREIGN PATENT DOCUMENTS

| | | |
|---|---|---|
| WO | 2011/062066 A1 | 5/2011 |
| WO | 2011/102683 A2 | 8/2011 |

\* cited by examiner

<Option1>

600 Information element indicating DMRS resource size

610 Information element indicating DMRS group

620 Information element indicating DMRS port assignment

630 Other downlink scheduling related information

Terminal 1 which is scheduled PDSCH on 1 RB assumes 12 REs per RB are used for DMRS Terminal 2 which is scheduled PDSCH on 2 RBs assumes 8 REs per RB are used for DMRS

▨ DMRS

METHOD AND APPARATUS FOR TRANSMITTING/RECEIVING CHANNELS IN MOBILE COMMUNICATION SYSTEM SUPPORTING MASSIVE MIMO

CROSS-REFERENCE TO RELATED APPLICATION

This application claims the benefit under 35 U.S.C. §119 (e) of a U.S. provisional application filed on Apr. 6, 2012 in the U.S. Patent and Trademark Office and assigned Ser. No. 61/621,176, the entire disclosure of which is hereby incorporated by reference.

BACKGROUND OF THE INVENTION

1. Field of the Invention

The present invention relates to a mobile communication system. More particularly, the present invention relates to a method and apparatus for transmitting/receiving channels between a base station and a mobile terminal efficiently in a mobile communication supporting massive Multiple Input Multiple Output (MIMO) transmission.

2. Description of the Related Art

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in 3rd Generation Partnership Project (3GPP), High Rate Packet Data (HRPD) defined in 3rd Generation Partnership Project-2 (3GPP2), and 802.16 defined in Institute of Electrical and Electronics Engineers (IEEE), have been developed to support the high-speed, high-quality wireless packet data communication services. Particularly, LTE corresponds to a communication standard developed to support high speed packet data transmission and to maximize the throughput of the radio communication system with various radio access technologies. LTE-A corresponds to an evolved version of LTE to improve the data transmission capability.

LTE is characterized by 3GPP Release 8 or 9 capable base station and terminal (User Equipment (UE)) while LTE-A is characterized by 3GPP Release 10 capable base station and UE. As a key standardization organization, 3GPP continues standardization of the next release for more improved performance beyond LTE-A.

The existing 3rd and 4th generation wireless packet data communication systems (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data amount to be transmitted according to the channel condition. For example, the transmitter is capable of decreasing the data transmission amount for bad channel condition so as to fix the received signal error probability at a certain level or increasing the data transmission amount for good channel condition so as to transmit large amount of information efficiently while maintaining the received signal error probability at an intended level. Meanwhile, the channel sensitive scheduling allows the transmitter to serve the user having good channel condition selectively among a plurality of users so as to increase the system capacity as compared to allocating a channel fixedly to serve a single user. This increase in system capacity is referred to as multi-user diversity gain. In brief, the AMC method and the channel-sensitive scheduling method are methods for receiving partial channel state information being fed back from a receiver, and applying an appropriate modulation and coding technique at the most efficient time determined depending on the received partial channel state information.

In a case of using AMC along with MIMO transmission scheme, it may be necessary to consider a number of spatial layers and ranks for transmitting signals. In this case, the transmitter determines the optimal data rate in consideration of the number of layers for use in MIMO transmission.

Recent research aims to replace Code Division Multiple Access (CDMA) used in the legacy 2nd and 3rd mobile communication systems with Orthogonal Frequency Division Multiple Access (OFDMA) for the next generation mobile communication system. The 3GPP and 3GPP2 are in the middle of the standardization of OFDMA-based evolved system. OFDMA is expected to provide superior system throughput as compared to the CDMA. One of the main factors that allow OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

As described above, LTE supports MIMO using a plurality of transmit and receive antennas. MIMO corresponds to a technique for transmitting information multiplexed spatially in adaptation to instantaneous channels established with plural transmit and receive antennas. The MIMO transmission is capable of multiplexing plural data streams spatially onto a single time-frequency resource so as to be able to increase the data rate a few folds as compared to the non-MIMO transmission. LTE Release 11 supports the MIMO transmission with up to 8 transmit antennas and up to 8 receive antennas. In this case, up to 8 data streams can be multiplexed spatially, resulting in increase of data rate up to 8 times more than non-MIMO transmission.

Typically, MIMO is classified into one of Single-User MIMO (SU-MIMO) for transmitting spatially multiplexed multiple data streams to a single user and Multi-User MIMO (MU-MIMO) for transmitting spatially multiplexed multiple data streams to multiple users.

In contrast to the SU-MIMO transmitting the spatially multiplexed multiple data streams to a single UE, the MU-MIMO is capable of transmitting the spatially multiplexed multiple data streams to multiple UEs. In the MU-MIMO, the evolved Node B (eNB) transmits plural data streams such that each UE is capable of receiving one or more of the data streams transmitted by the eNB. Accordingly, the MU-MIMO is advantageous especially when the number of eNB's transmit antennas is greater than the number of UE's receive antennas.

In the case of SU-MIMO, the maximum number of data streams capable of being multiplexed spatially is restricted by min(NTx, NRx) where NTx denotes the number of eNB's transmit antennas and NRx denotes the number of UE's receive antennas. Meanwhile, in the case of MU-MIMO, the maximum number of data streams capable of being multiplexed spatially is restricted by min(NTx, NMS X NRx) where NMS denotes the number of UEs.

Massive MIMO or Full Dimension MIMO is an emerging technology feasible with a few dozen to a few hundred of eNB's transmit antennas. Thus, in order to enhance the system throughput, it is required to increase the number of data streams significantly as compared to the legacy LTE system. In order to accomplish this, the massive MIMO transmission scales up the MU-MIMO for simultaneous transmission to multiple UEs by an order of magnitude.

Therefore, a need exists for a channel transmission/reception method and apparatus capable of allocating Demodulation Reference Signal (DMRS) resource guaranteeing orthogonality among a plurality of UEs in the massive MIMO system The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problem and/or disadvantages and to provide at least the advantages described below. Accordingly, an aspect of the present invention is to provide a channel transmission/reception method and apparatus capable of allocating Demodulation Reference Signal (DMRS) resource guaranteeing orthogonality among a plurality of User Equipments (UEs) in the massive Multiple Input Multiple Output (MIMO) system.

In accordance with an aspect of the present invention, a channel transmission method of a base station in a mobile communication system supporting massive MIMO is provided. The method includes determining a resource to which a DMRS addressed to a terminal is mapped within a resource block, the DMRS resource being positioned in at least one of a first resource set capable of being allocated for DMRS and a second resource set symmetric with the first resource set on a time axis, and transmitting the DMRS and DMRS allocation information to the terminal.

In accordance with another aspect of the present invention, a channel reception method of a terminal in a mobile communication system supporting massive MIMO is provided. The method includes receiving DMRS allocation information from a base station, and determining a resource to which the DMRS addressed to the terminal is mapped within a resource block, a DMRS resource being positioned in at least one of a first resource set capable of being allocated for DMRS and a second resource set symmetric with the first resource set on a time axis.

In accordance with another aspect of the present invention, a channel transmission apparatus of a base station in a mobile communication system supporting massive MIMO is provided. The apparatus includes a transceiver which transmits and receives signals and data to and from a terminal, and a controller which controls determining a resource to which a DMRS addressed to a terminal is mapped within a resource block, the DMRS resource being positioned in at least one of a first resource set capable of being allocated for DMRS and a second resource set symmetric with the first resource set on a time axis.

In accordance with another aspect of the present invention, a channel reception apparatus of a terminal in a mobile communication system supporting massive MIMO is provided. The apparatus includes a transceiver which transmits and receives signals and data to and from a base station, and a controller which controls determining a resource to which the DMRS addressed to the terminal is mapped within a resource block, a DMRS resource being positioned in at least one of a first resource set capable of being allocated for DMRS and a second resource set symmetric with the first resource set on a time axis.

In accordance with another aspect of the present invention, a channel transmission method of a base station in a mobile communication system supporting massive MIMO is provided. The method includes determining resources to which DMRS addressed to a terminal is mapped within at least one resource block, a number of the DMRS resources being determined based on a number of consecutive resource block on a frequency in a subframe scheduled for downlink data transmission to the terminal, and transmitting the DMRS to the terminal.

In accordance with another aspect of the present invention, a channel reception method of a terminal in a mobile communication system supporting massive MIMO is provided. The method includes receiving downlink scheduling information from a base station, and receiving DMRS on the DMRS resources of which number allocated in a resource block is determined based on a number of consecutive resource block on a frequency in a subframe scheduled for downlink data transmission to the terminal.

In accordance with another aspect of the present invention, a channel transmission apparatus of a base station in a mobile communication system supporting massive MIMO is provided. The apparatus includes a transceiver which transmits and receives signals and data to and from a terminal, and a controller which controls determining resources to which DMRS addressed to a terminal is mapped within at least one resource block, a number of the DMRS resources being determined based on a number of consecutive resource block on a frequency in a subframe scheduled for downlink data transmission to the terminal, and transmitting the DMRS to the terminal.

In accordance with still another aspect of the present invention, a channel reception apparatus of a terminal in a mobile communication system supporting massive MIMO is provided. The apparatus includes a transceiver which transmits and receives signals and data to and from a base station, and a controller which controls receiving downlink scheduling information from a base station and DMRS on the DMRS resources of which number allocated in a resource block is determined based on a number of consecutive resource blocks on a frequency in a subframe scheduled for downlink data transmission to the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the Orthogonal Frequency Division Multiple Access (OFDM)-based radio communication system, particularly the 3rd Generation Partnership Project (3GPP) Evolved Universal Terrestrial Radio Access (EUTRA), it will be understood by those skilled in the art that the present invention can be applied even to other communication systems having the similar technical background and channel format, with a slight modification, without departing from the spirit and scope of the present invention.

Figure 1:
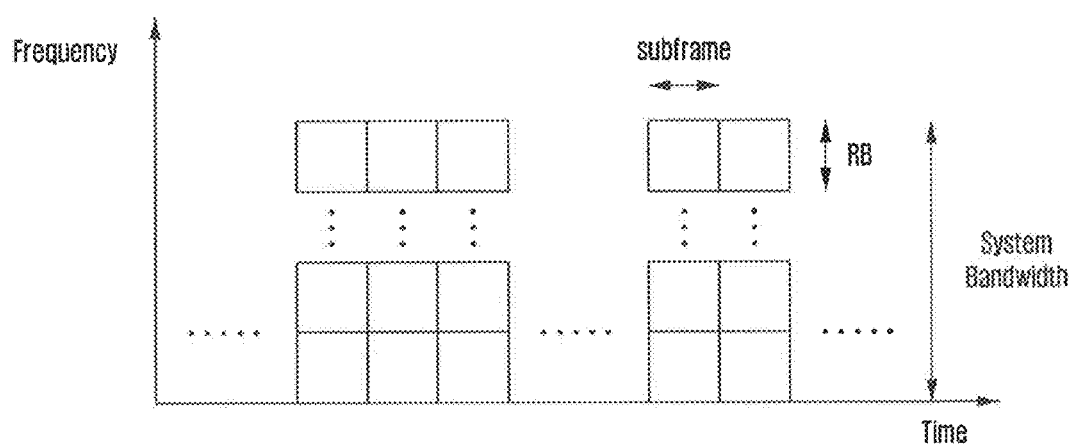
FIG. 1 is a diagram illustrating a time-frequency resource structure of Long Term Evolution (LTE)/Long Term Evolution-Advanced (LTE-A) system according to an exemplary embodiment of the present invention.

FIG. 1 is a diagram illustrating a time-frequency resource structure of Long Term Evolution (LTE)/Long Term Evolution-Advanced (LTE-A) system according to an exemplary embodiment of the present invention.

Referring to FIG. 1, the radio resource is divided into Resource Blocks (RBs) in the frequency domain and subframes in the time domain. An RB comprises 12 subcarriers corresponding to the bandwidths of 18 kHz. Meanwhile, a subframe comprises 14 OFDM symbols corresponding to 1 msec time duration. In the LTE/LTE-A system, the resource scheduling is performed in a unit of a subframe in the time domain and in a unit of an RB in the frequency domain.

Figure 2:
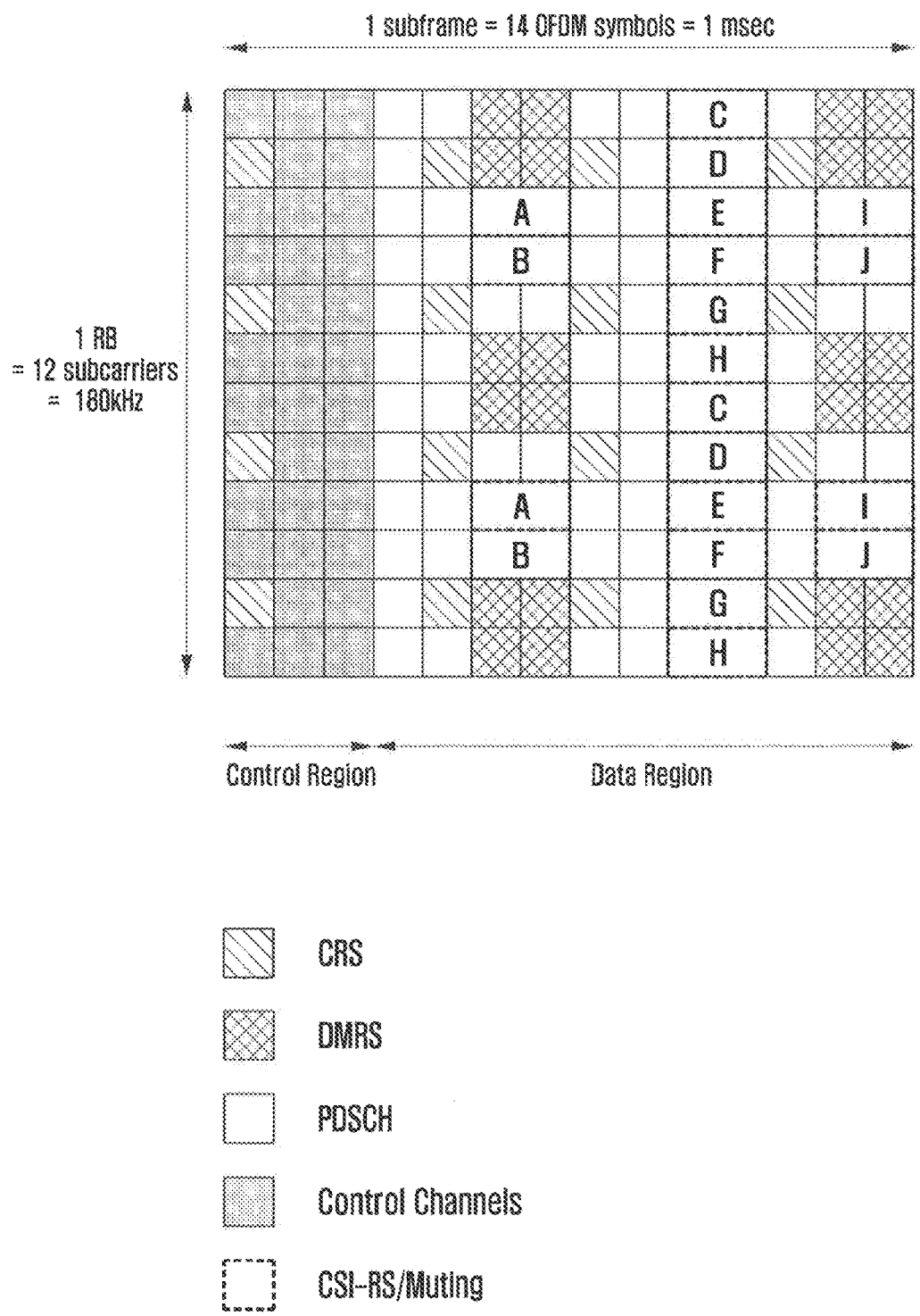
FIG. 2 is a diagram illustrating a Resource Block (RB) for a subframe as a minimum quantum of resource for downlink scheduling in an LTE/LTE-A system to an exemplary embodiment of the present invention.

FIG. 2 is a diagram illustrating an RB for a subframe as a minimum quantum of resource for downlink scheduling in an LTE/LTE-A system according to an exemplary embodiment of the present invention.

Referring to FIG. 2, the radio resource corresponds to one subframe in the time domain and one RB in the frequency domain. As aforementioned, an RB comprises 12 subcarriers in the frequency domain and 14 OFDM symbols (e.g., total 168 time-frequency positions). In the LTE/LTE-A system, each time-frequency position is referred to as Resource Element (RE).

With the radio resource structured as shown in FIG. 2, a number of different signals as follows are transmitted:

1. Cell Specific Reference Signal (CRS): Transmitted for all User Equipments (UEs) to receive within a cell.

2. Demodulation Reference Signal (DMRS): Transmitted to a specific UE for channel estimation to recover the information on Physical Downlink Shared Channel (PDSCH). A DMRS resource or port is transmitted with the application of the same precoding linked thereto. A UE scheduled to receive on a specific layer of PDSCH receives the DMRS port linked to the corresponding layer for channel estimation and then recovers the information on the corresponding layer based on the estimation result.

3. PDSCH: Used for downlink data transmission from the evolved Node B (eNB) to the UE on the REs with the exception of the REs to which the reference signals are mapped in the data region of FIG. 2.

4. Channel Status Information Reference Signal (CSI-RS): Transmitted to the UEs within one cell for use in channel state measurement. A plurality of CSI-RS can be transmitted within a cell.

5. Other control channels (e.g., Physical Hybrid-ARQ Indicator Channel (PHICH), Physical Control Format Indicator Channel (PCFICH), PDCCH, and the like): Used for the UE to transmit the control information necessary for receiving PDSCH or Hybrid Automatic Repeat Request (HARQ) ACK/NACK corresponding to the uplink data transmission.

In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource in general. In the LTE-A system, the zero power CSI-RS is referred to as muting. The zero power CSI-RS (muting) by nature is mapped to the CSI-RS position without transmission power allocation.

Referring to FIG. 2, the CSI-RS can be transmitted at some of the positions marked by A, B, C, D, E, F, G, H, I, and J according to the number of number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, entire of the specific pattern is used for CSI-RS transmission; and for eight antenna ports, two patterns are used for CSI-RS transmission. Meanwhile, although the zero power CSI-RS (muting) can be applied to multiple pattern, the zero power CSI-RS cannot be applied to a part of one pattern if the positions are not overlapped with CSI-RS position.

In the Multi-User MIMO (MU-MIMO), the number of UEs for simultaneous transmission is closely related to the downlink DMRS structure. The downlink DMRS aims to provide the UE with the channel estimation information for use in recovering information carried on PDSCH. As aforementioned, the DMRS is precoded along with the PDSCH in the LTE system such that the UE is capable of using the channel estimation value acquired through the channel estimation on the DMRS for decoding PDSCH.

For example, the channel estimation on the DMRS should be guaranteed to some extent to make it possible to recover the PDSCH. This means that K UEs receiving data in MU-MIMO transmission should have the DownLink (DL) DMRSs channel estimation capabilities to some extent in order to receive PDSCHs.

The LTE system is designed to transmit plural DMRSs. In order to use multiple DMRS ports on the same radio resource in MU-MIMO, a scrambling function is provided to secure orthogonality or interference randomization among the DMRS ports. In a LTE Release 11 system, DMRS ports 7 and 8 may be used in MU-MIMO transmission. In order to secure orthogonality between the DMRS ports 7 and 8, the DMRSs are spread with different orthogonal codes on the time axis so as to be transmitted at the DMRS transmission positions as shown in FIG. 2. The eNB is capable of randomizing the interference between DMRSs by applying different scrambling codes to the per-UE DMRSs transmitted at the same positions. Typically, when allocating DMRS resources to two UEs, the channel estimation performance with the orthogonal DMRS resource allocation is superior to the channel estimation performance with non-orthogonal DMRS resource allocation.

As described above, LTE Release 11 is capable of utilizing up to two orthogonal DMRS resources (DMRS ports 7 and 8). For example, the orthogonal DMRS resource allocation is applicable for only the MU-MIMO transmission to two UEs. If the number of UEs for MU-MIMO transmission is three or more, the orthogonality among the DMRS resources is not guaranteed and thus differentiation among the DMRSs relies on scrambling. For this reason, MU-MIMO transmission is performed up to two UEs in the real LTE system.

Figure 3:
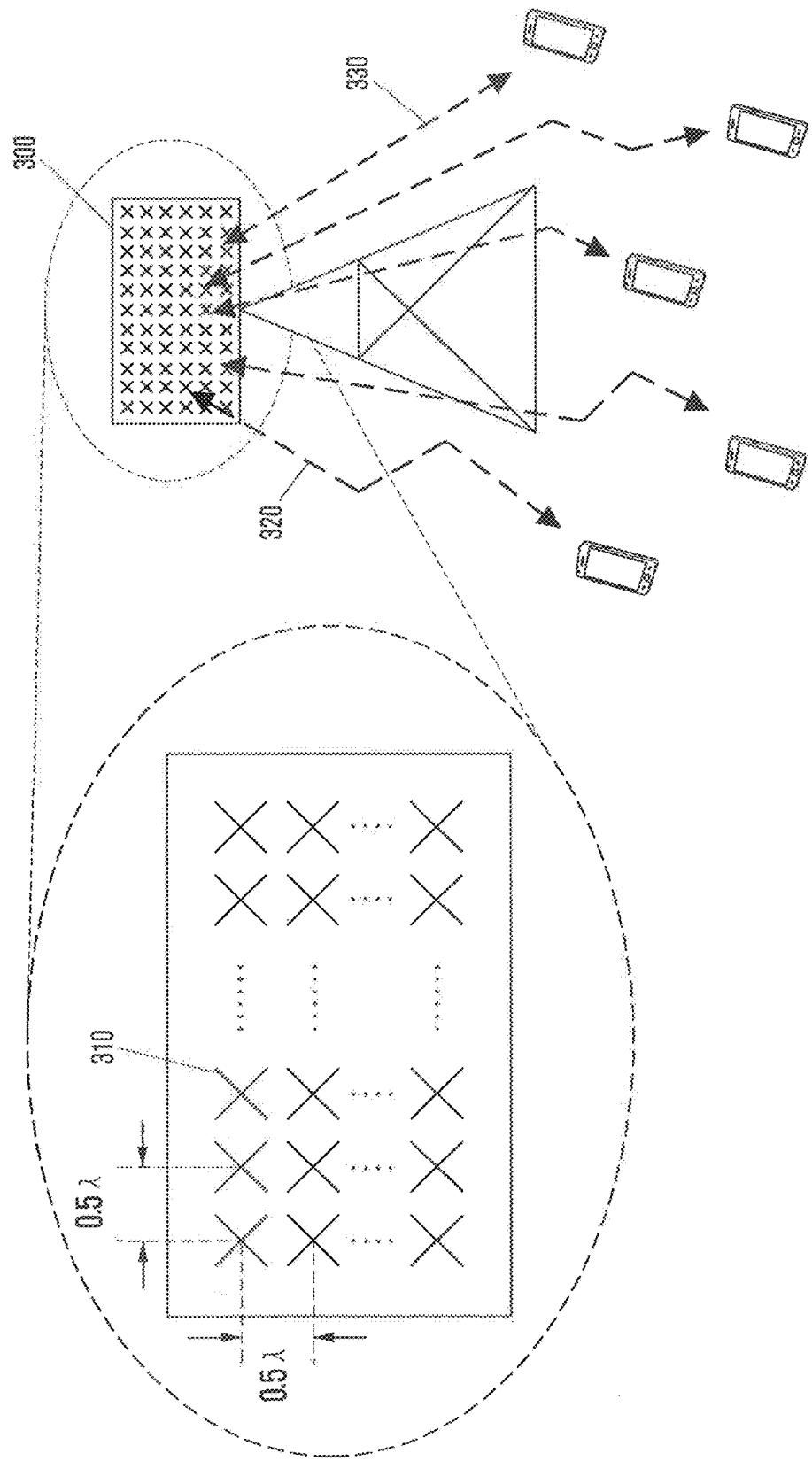
FIG. 3 is a diagram illustrating an evolved Node B (eNB) with Massive Multiple Input Multiple Output (MIMO) capability to multiple User Equipments (UEs) in a mobile communication system according to an exemplary embodiment of the present invention.

FIG. 3 is a diagram illustrating an eNB with Massive Multiple Input Multiple Output (MIMO) capability to multiple UEs in a mobile communication system according to an exemplary embodiment of the present invention.

Referring to FIG. 3, the eNB transmits signals to a plurality of UEs through multiple transmit antennas as denoted by reference number 300 (e.g., through antenna array 300). The multiple transmit antennas can be configured as a 2-Dimentional (2D) antenna array panel structure in which the antennas 310 are arranged with a distance corresponding to the wavelength function therebetween. With the antenna array 300, the eNB is capable of a high order MU-MIMO transmission. The high order MU-MIMO transmission corresponds to transmission of data with the transmission beams 320 and 330 separate spatially to plural UEs using multiple eNBs' transmit antennas. The high order MU-MIMO is advantageous in improving the system throughput dramatically with the same time and frequency resource.

In order to accomplish the high order MU-MIMO for simultaneous transmission to plural users with the same time and frequency resources, an appropriate DMRS structure is necessary as described above. The appropriate DMRS structure corresponds to the DMRS structure guaranteeing orthogonality among plural UEs in the high order MU-MIMO transmission. The legacy LTE/LTE-A Release 11 guaranteeing orthogonality between DMRS ports for up to two UEs has to be extended in capacity to optimize the throughput of the Massive MIMO system with more orthogonality-guaranteed DMRS ports. The orthogonality-guaranteed DMRS ports are the DMRS port resources orthogonal in frequency, time, or code such that the corresponding DMRS port or data signal and other users' DMRS ports or data signals do not interfere to each other. The orthogonality-guaranteed DMRS ports are advantageous in that the per-UE channel estimation based on DMRS port can be performed without interference of the signal transmitted to other UEs.

Figure 4:
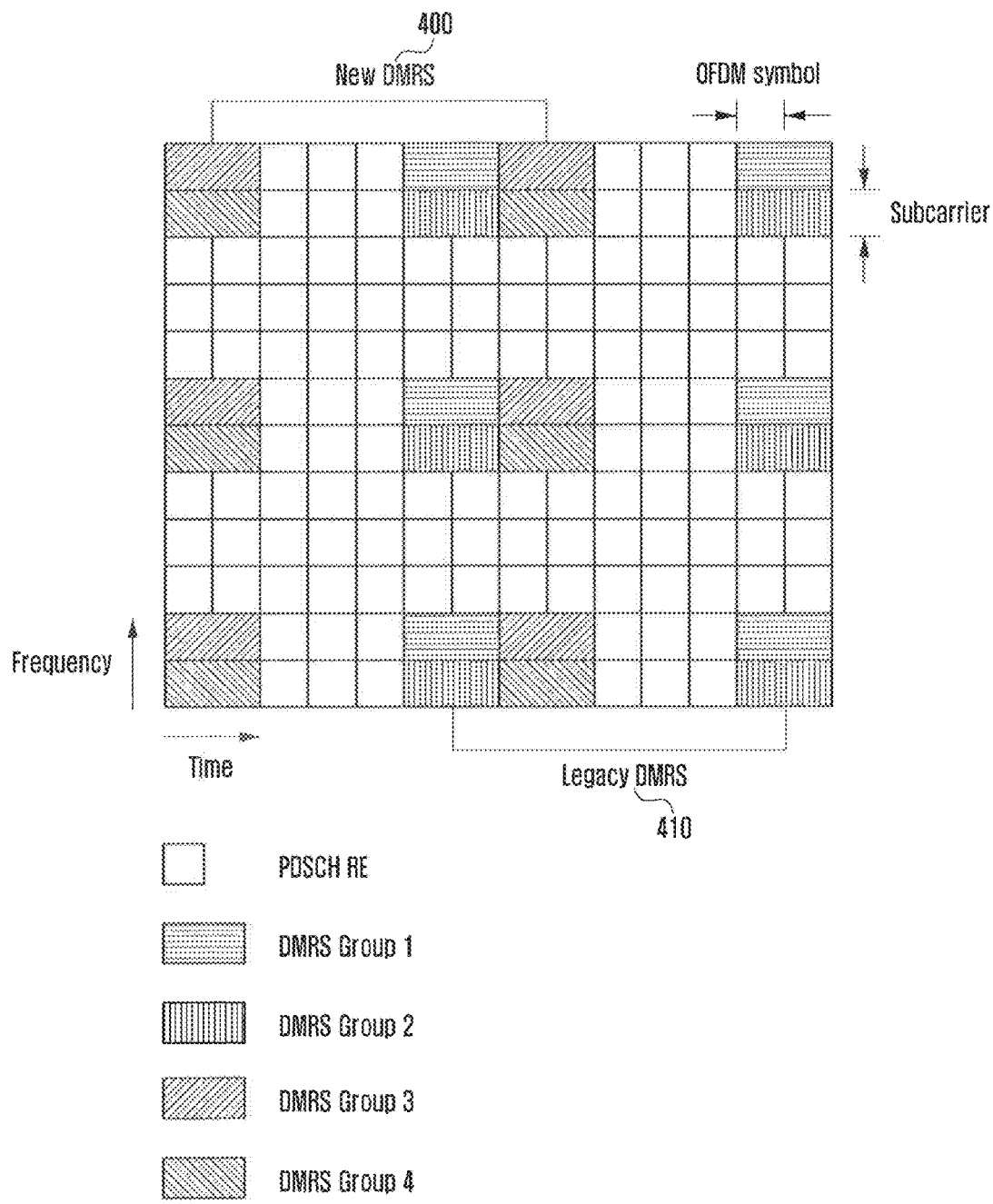
FIG. 4 is a diagram illustrating a Demodulation Reference Signal (DMRS) structure for a Massive MIMO transmission according to an exemplary embodiment of the present invention.

FIG. 4 is a diagram illustrating a DMRS structure for a Massive MIMO transmission according to an exemplary embodiment of the present invention.

The DMRS structure of FIG. 4 comprises four DMRS groups. In FIG. 4, the DMRS groups 1 and 2 correspond to the legacy DMRSs 410 defined for allocating DMRS in the legacy LTE/LTE-A system, and the DMRS groups 3 and 4 are new DMRSs 400 proposed in an exemplary embodiment of the present invention.

Each DMRS group is capable of supporting up to 4 orthogonal DMRS ports. Therefore, up to 16 orthogonal DMRS ports can be realized in the proposed DMRS structure of FIG. 4. Accordingly, up to 16 UEs can be scheduled simultaneously in the MU-MIMO transmission.

According to an exemplary embodiment of the present invention, the four DMRS ports of each DMRS group are allocated orthogonal code sequences to guarantee the orthogonality therebetween. For example, the four DMRS ports of a DMRS group can be allocated the orthogonal code sequences as shown in Table 1.

TABLE 1

| DMRS port 1 | Orthogonal Code Sequence 1: [+1, +1, +1, +1] |
| DMRS port 2 | Orthogonal Code Sequence 1: [+1, −1, +1, −1] |
| DMRS port 3 | Orthogonal Code Sequence 1: [+1, +1, −1, −1] |
| DMRS port 4 | Orthogonal Code Sequence 1: [+1, −1, −1, +1] |

As shown in Table 1, each code sequence is made up of four symbols. For each DMRS port, the four symbols are transmitted on the 4 OFDM symbols of the same subcarrier. Each DMRS port is precoded with the same precoding as that of the data signal with which it is intended for as described above.

In Table 1, the code sequences of length 4 are used to differentiate among up to 4 orthogonal DMRS ports of each DMRS group. According to an exemplary embodiment of the present invention, the code sequence of length 2 can be used to acquire up to two DMRS ports instead of the code sequences of length 4. According to such an exemplary embodiment of the present invention, because the length of each sequence code is 2, each code sequence repeats twice on the four OFDM symbols of the same subcarrier. The code sequence of length 2 reduces the number of orthogonal DMRS ports but allocates relatively large amount of radio resource to the corresponding port and thus takes advantage in channel estimation performance. In the case of using the orthogonal code sequence of length 2, it is possible to support up to 8 orthogonal DMRS ports.

Also, the orthogonal code sequences of length 2 and length 4 can be used together. For example, the DMRS ports transmitted in the four DMRS groups as shown in FIG. 4 can use the orthogonal code sequences of length 2 and length 4 selectively. In this case, the number of supportable orthogonal DMRS ports is in the range from 8 to 16.

Referring to FIG. 4, the legacy DMRS resource 410 and the newly proposed DMRS resource 400 are arranged symmetrically. For example, the legacy DMRS resource 410 is symmetrical with the new DMRS resource 400 with respective to the time axis and, especially, the symmetric axis is the center of a subframe. This formation is advantageous to use the same channel estimator for estimating channels with DMRS ports on the two DMRS resources.

The DMRS structure of FIG. 4 has the following characteristics:

Up to 16 orthogonal DMRS ports can be utilized;

All of the 16 orthogonal DMRS ports have the same pattern. The pattern of any DMRS group can be obtained by applying a time/frequency shift to the pattern of any other DMRS group; and The new DMRS 400 is symmetric to the legacy DMRS 410.

As described above, the large number of orthogonal DMRS ports is advantageous in realizing efficient MU-MIMO transmission for large number of UEs. Also, the symmetry of the DMRS resources and time/frequency shift-based DMRS arrangement are advantageous in minimization of the DMRS channel estimator implementation complexity.

In order to utilize the DMRS structure of FIG. 4, it may be necessary to notify the co-scheduled UEs of the DMRS structure. For example, the network should indicate to the UEs which DMRS ports to use.

The DMRS port information sent a UE changes in every transmission, and the number of DMRS ports can change depending on the scheduling decision of the eNB. For example, the UE may be allocated the DMRS port 1 at the ith subframe and DMRS ports 3 and 4 at the $(i+1)^{th}$ subframe. In this way, the DMRS port allocation is performed depending on the scheduling decision of the eNB and radio resource distribution. Although at least 8 DMRS ports should be utilized for the MU-MIMO transmission to 8 UEs in the massive MIMO system, the number of DMRS ports can be changed if the number of UEs increases or decreases.

According to an exemplary embodiment of the present invention, three methods for notifying the co-scheduled UEs of DMRS port allocation are proposed. In the following, descriptions are made of the three notification methods with the exception of other signals such as CRS and CSI-RS. It is assumed that CRS and CSI-RS are transmitted on the radio resource configured by the eNB.

In the first exemplary embodiment of the present invention, the eNB notifies the UE of the DMRS port allocation through physical layer signaling. For example, the eNB notifies each UE of the DMRS allocation information including at least one of the following information through physical layer signaling:

A size of DMRS resource in transport block to be transmitted to UE;

An allocated DMRS group; and

An allocated DMRS port(s) within the allocated DMRS group.

Figure 5:
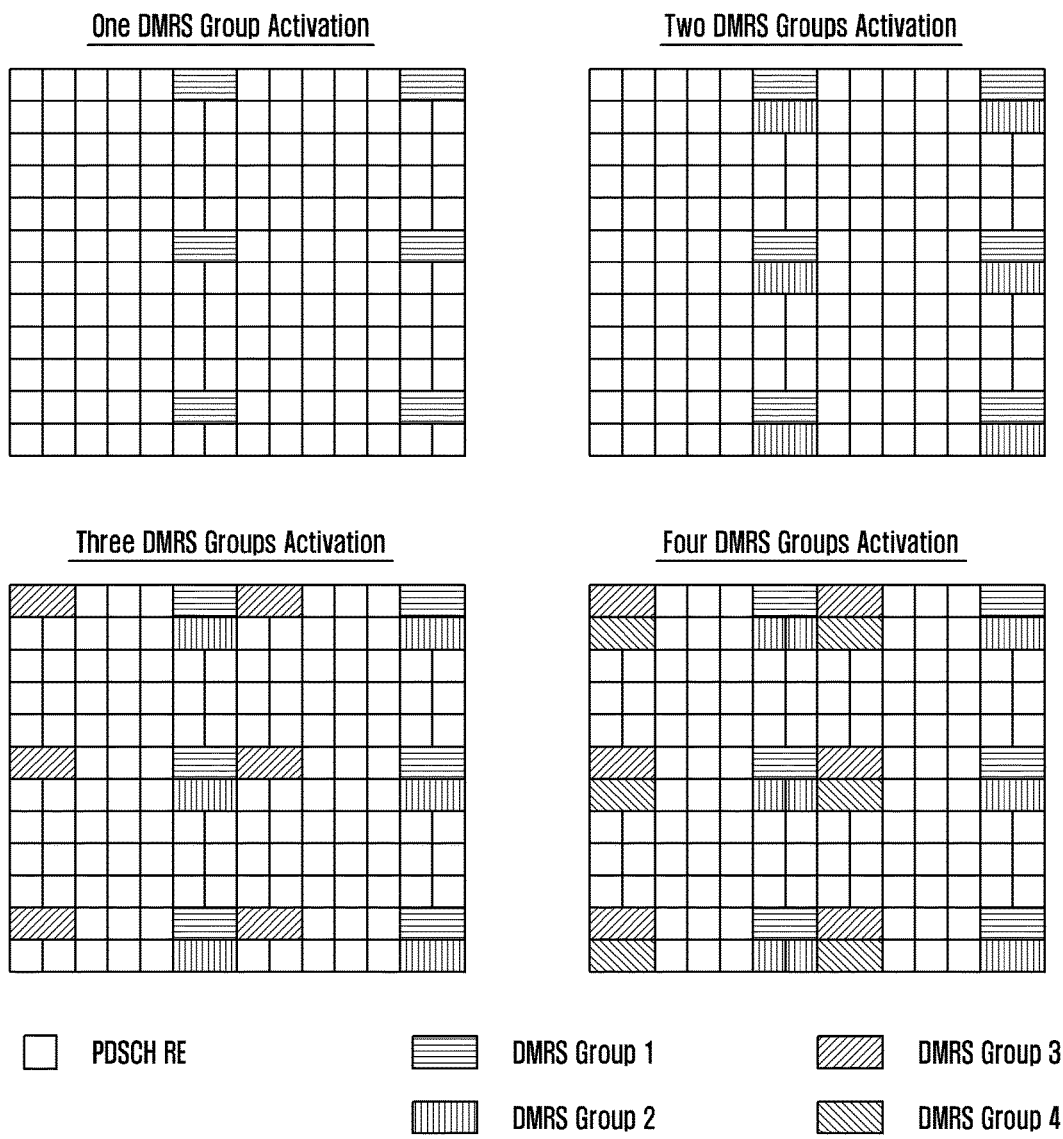
FIG. 5 is a diagram illustrating exemplary structures of an RB with a DMRS pattern for use in a transmission method according to an exemplary embodiment of the present invention.

FIG. 5 is a diagram illustrating exemplary structures of an RB with a DMRS pattern for use in a transmission method according to an exemplary embodiment of the present invention.

Referring to FIG. 5, the activated DMRS group corresponds to the resource capable of DMRS allocation in the size of DMRS resources.

According to exemplary embodiments of the present invention, the UE is capable of determining the total resource allocated for DMRS transmission based on the DMRS resources information included in the DMRS allocation information. The size of the DMRS resources may include the DMRS resource for the DMRS port transmission to other co-scheduled UEs as well as the DMRS resource for the DMRS port transmission to a specific UE. The UE is also capable of determining the REs to which the DMRS ports allocated to the UE are mapped among the radio resources allocated for DMRS based on the DMRS group notification. If the notified DMRS resource size is larger than the size of the DMRS resources allocated to itself, the UE assumes that the DMRS or data transmission is muted on the DMRS resource not allocated to the UE. In addition, the UE is capable of determining the code resource used for DMRS port transmission to the UE based on the indication of allocated DMRS port in the assigned DMRS group.

The DMRS resource size, assigned DMRS group, and allocated DMRS port included in the DMRS allocation information are notified to the UE as summarized in Tables 2 and 3.

TABLE 2

| | Code Point | Indication |
|---|---|---|
| Information Element 1: Indicate the size of the DMRS resources (2 bits) | 00 | DMRS resource size = 1 DMRS group |
| | 01 | DMRS resource size = 2 DMRS groups |
| | 10 | DMRS resource size = 3 DMRS groups |
| | 11 | DMRS resource size = 4 DMRS groups |
| Information Element 2: Indicate the allocated DMRS group (2 bits) | 00 | UE assigned DMRS group 1 |
| | 01 | UE assigned DMRS group 2 |
| | 10 | UE assigned DMRS group 3 |
| | 11 | UE assigned DMRS group 4 |
| Information Element 3: Indicate the allocated DMRS port within the DMRS group (2 bits) | 00 | UE assigned DMRS port 1 within assigned DMRS group |
| | 01 | UE assigned DMRS port 2 within assigned DMRS group |
| | 10 | UE assigned DMRS port 3 within assigned DMRS group |
| | 11 | UE assigned DMRS port 4 within assigned DMRS group |

TABLE 3

| | Code Point | Indication |
|---|---|---|
| Information Element 1: Indicate the size of the DMRS resources (2 bits) | 00 | DMRS resource size = 1 DMRS group (DMRS Group 1) |
| | 01 | DMRS resource size = 2 DMRS groups (DMRS Group 1, 2) |
| | 10 | DMRS resource size = 3 DMRS groups (DMRS Group 1, 2, 3) |
| | 11 | DMRS resource size = 4 DMRS groups (DMRS Group 1, 2, 3, 4) |
| Information Element 2: Indicate the allocated DMRS group (2 bits) | 00 | UE assigned DMRS group 1 |
| | 01 | UE assigned DMRS group 2 |
| | 10 | UE assigned DMRS group 3 |
| | 11 | UE assigned DMRS group 4 |
| Information Element 3: Indicate the allocated DMRS port within the DMRS group (3 bits) | 000 | UE assigned DMRS port 1 within assigned DMRS group |
| | 001 | UE assigned DMRS port 2 within assigned DMRS group |
| | 010 | UE assigned DMRS port 3 within assigned DMRS group |
| | 011 | UE assigned DMRS port 4 within assigned DMRS group |
| | 100 | UE assigned DMRS port 1, 2 within assigned DMRS group |
| | 101 | UE assigned DMRS port 3, 4 within assigned DMRS group |
| | 110 | UE assigned DMRS port 1, 2, 3 within assigned DMRS group |
| | 111 | UE assigned DMRS port 1, 2, 3, 4 within assigned DMRS group |

In the DMRS allocation indication methods based on Tables 2 and 3, the UE determines the size of the entire DMRS resource based on the information element 1 and the DMRS group allocated to the UE based on the information element 2. The UE assumes that the DMRS and PDSCH transmission are muted on the radio resource of other DMRS groups with the exception of the DMRS group indicated by the information element 2 among the DMRS resource indicated by the information element 1.

Although it is assumed that one UE is allocated only one DMRS group in Tables 2 and 3, plural DMRS groups can be allocated to a UE in the same way. Finally, the UE is capable of determining the allocated DMRS port in the assigned DMRS group based on the information element 3.

The above three DMRS allocation informations (DMRS resource size, assigned DMRS group, and allocated DMRS port) can be notified to the UE independently or in the aggregated format through joint encoding.

Figure 6A:
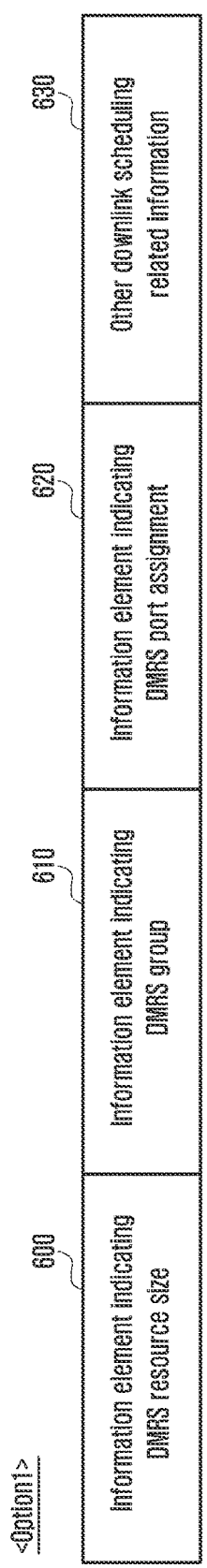
FIGS. 6A to 6C are diagrams illustrating three formats of Demodulation Reference Signal (DMRS) allocation information for use in a transmission method according to an exemplary embodiment of the present invention.
Figure 6B:
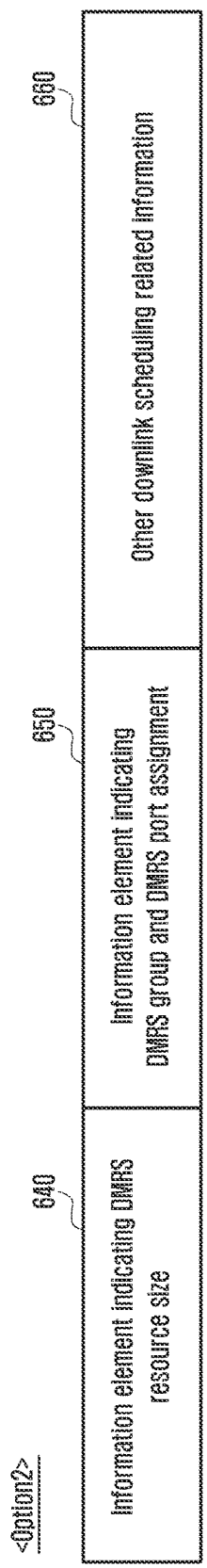
Figure 6C:
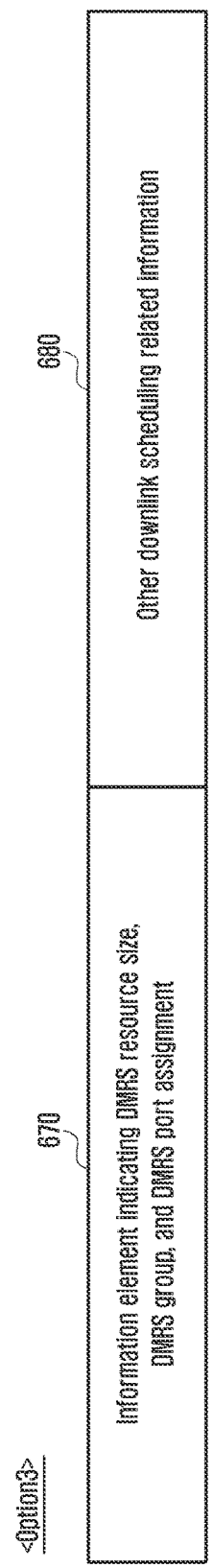

FIGS. 6A to 6C are diagrams illustrating three formats of DMRS allocation information for use in a transmission method according to an exemplary embodiment of the present invention.

Referring to FIG. 6A, the format of transmitting informations individually based on Tables 2 and 3 is provided. For example, the three information and other DL scheduling information are transmitted in the respective information elements 600, 610, 620, 630.

Referring to FIG. 6B, the format of transmitting the DMRS size information, the jointly encoded DMRS group and DMRS port assignment information, and other downlink scheduling informations in the respective information elements 640, 650, and 660, is provided.

Referring to FIG. 6C, the format of transmitting the jointly encoded DMRS size, DMRS group assignment, and DMRS port allocation informations in one information element 670 and other downlink scheduling information in another information element 680, is provided.

Figure 7:
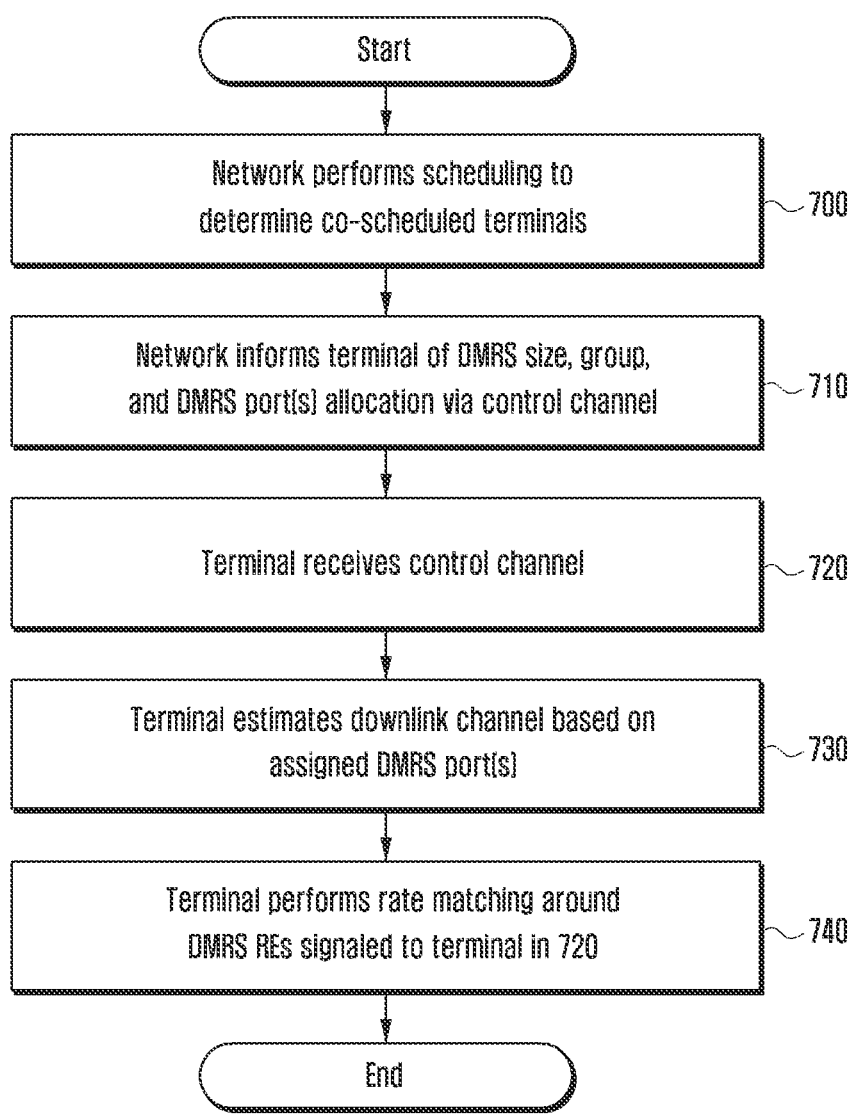
FIG. 7 is a flowchart illustrating an eNB procedure of determining DMRS allocation for massive MIMO and indicating DMRS allocation information to a UE in a transmission method according to an exemplary embodiment of the present invention.

FIG. 7 is a flowchart illustrating an eNB procedure of determining DMRS allocation for massive MIMO and indicating DMRS allocation information to a UE in a transmission method according to an exemplary embodiment of the present invention.

Referring to FIG. 7, the eNB performs scheduling to determine co-scheduled UEs at step 700. Scheduling is a process of selecting UEs for downlink transmission, and the eNB determines the UEs in consideration of the downlink channel state and data amount. Once the UEs for DL MU-MIMO transmission with the same radio resource have been determined at step 700, the eNB determines the size of the DMRS resource for transmission to the selected UEs, DMRS group per UE, and DMRS port(s) per UE.

The DMRS allocation information determined at step 700 is transmitted to the co-scheduled UEs at step 710. The eNB is capable of transmitting the DMRS allocation information through PDCCH or E-PDCCH for physical layer control signal transmission in LTE/LTE-A.

At step 720, each UE receives the PDCCH or E-PDCCH transmitted by the eNB and determines the DMRS allocation information addressed thereto. The DMRS allocation information received by the UE includes the DMRS resource size, assigned DMRS group, and allocated DMRS port(s).

The UE assumes, based on the information acquired at step 720, that the radio resource with the exception of the part carrying the DMRS addressed thereto as the resource used for neither DMRS transmission nor PDSCH transmission at step 730. For example, at step 730, the UE estimates a DL channel based on the assigned DMRS ports.

By taking notice of this, the UE determines the REs to which the PDSCH addressed thereto is mapped and receives the PDSCH thereon at step 740. For example, the UE performs rate matching around DMRS REs signaled to the UE.

For example, if the UE is notified that the DMRS size is 4 or four DMRS groups are used in DMRS allocation and DMRS group 2 is assigned to the UE, the corresponding UE attempts receiving data under the assumption that the DMRS is received at position in the DMRS group 2 and PDSCH is received on the rest radio resource with the exception of the DMRS groups 1, 2, 3, and 4.

In the DMRS allocation notification procedure according to the second exemplary embodiment of the present invention, the eNB notifies the UE of the DMRS resource size through higher layer signaling and of the assigned DMRS group and DMRS port(s) through physical layer control channel. In this case, the following informations are transmitted to the UE through physical control channel (e.g., PDCCH, Enhanced Physical Downlink Control Channel (E-PDCCH), and the like):

Allocated DMRS group; and

Allocated DMRS port(s) within the DMRS group.

In the case in which the UE is notified of the DMRS resource size through higher layer signal and other information through physical layer control channel as in the second exemplary embodiment of the present invention, it is advantageous to reduce the DL overhead caused by the DMRS-related control information. For example, it may be advantageous to reduce the DL overhead caused by the DMRS-related control information because the control information transmitted through physical layer control channel varies frequently, particularly at every 1msec in LTE/LTE-A, in contrast to the control signal transmitted through higher layer signal which varies little for relatively long time duration.

However, in the case of the UE is notified of the DMRS resource size through higher layer signaling, dealing with the change of the number of co-scheduled UEs dynamically is difficult and thus there is a need of securing a sufficiently large DMRS resource. For example, when the number of co-scheduled UEs is changed dynamically in the range from 4 to 8, the eNB is capable of notifying the UE of the DMRS resource size supporting DMRS ports for 8 UEs through higher layer signaling. As a consequence, the eNB may fail to optimize the DMRS resource size depending on the co-scheduled UEs combination, thereby resulting in redundancy or shortage of DMRS resource.

Figure 8:
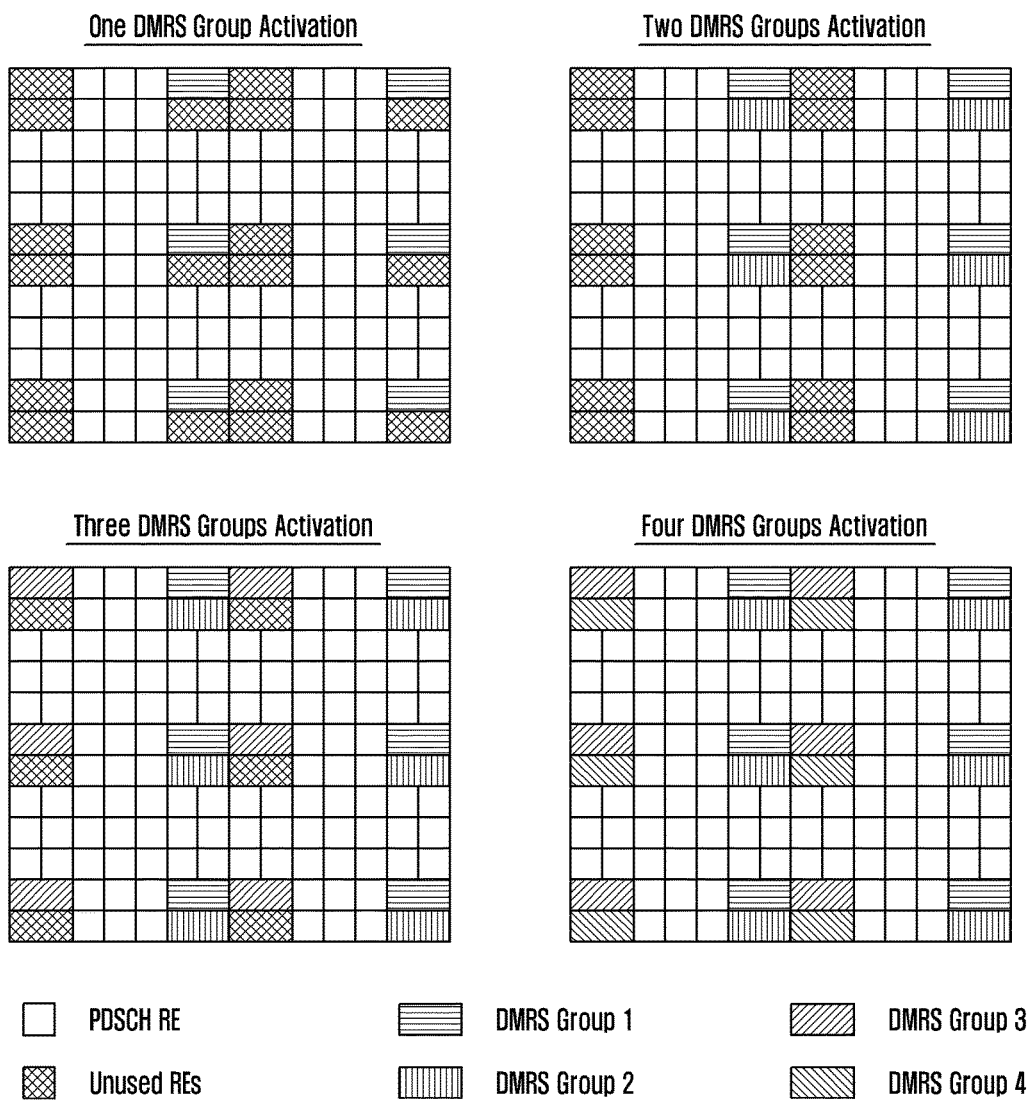
FIG. 8 is a diagram illustrating exemplary structures of an RB with a DMRS pattern for use in a transmission method according to a second exemplary embodiment of the present invention.

FIG. 8 is a diagram illustrating exemplary structures of an RB with a DMRS pattern for use in a transmission method according to a second exemplary embodiment of the present invention.

Referring to FIG. 8, the eNB notifies the UE of DMRS resource size=4 through higher layer signaling. In this case, the signal can be transmitted on the PDSCH mapped to the radio resource for four DMRS group regardless of the number of DMRS group for use in real DMRS allocation, and the DMRS groups not used in real DMRS allocation on this radio resource are maintained in the state not used as shown in FIG. 8.

In the second exemplary embodiment of the present invention, the DMRS group allocation and DMRS port allocation based on the physical layer control channel (e.g., PDCCH or E-PDCCH, and the like), can be performed as summarized in Tables 4 and 5.

TABLE 4

| | Code Point | Indication |
|---|---|---|
| Information Element 2: Indicate the allocated DMRS group (2 bits) | 00 | UE assigned DMRS group 1 |
| | 01 | UE assigned DMRS group 2 |
| | 10 | UE assigned DMRS group 3 |
| | 11 | UE assigned DMRS group 4 |
| Information Element 3: Indicate the allocated | 00 | UE assigned DMRS port 1 within assigned DMRS group |

TABLE 4-continued

| | Code Point | Indication |
|---|---|---|
| DMRS port within the DMRS group (2 bits) | 01 | UE assigned DMRS port 2 within assigned DMRS group |
| | 10 | UE assigned DMRS port 3 within assigned DMRS group |
| | 11 | UE assigned DMRS port 4 within assigned DMRS group |

TABLE 5

| | Code Point | Indication |
|---|---|---|
| Information Element 2: Indicate the allocated DMRS group (2 bits) | 00 | UE assigned DMRS group 1 |
| | 01 | UE assigned DMRS group 2 |
| | 10 | UE assigned DMRS group 3 |
| | 11 | UE assigned DMRS group 4 |
| Information Element 3: Indicate the allocated DMRS port within the DMRS group (3 bits) | 000 | UE assigned DMRS port 1 within assigned DMRS group |
| | 001 | UE assigned DMRS port 2 within assigned DMRS group |
| | 010 | UE assigned DMRS port 3 within assigned DMRS group |
| | 011 | UE assigned DMRS port 4 within assigned DMRS group |
| | 100 | UE assigned DMRS port 1, 2 within assigned DMRS group |
| | 101 | UE assigned DMRS port 3, 4 within assigned DMRS group |
| | 110 | UE assigned DMRS port 1, 2, 3 within assigned DMRS group |
| | 111 | UE assigned DMRS port 1, 2, 3, 4 within assigned DMRS group |

Unlike the DMRS allocation based on Tables 2 and 3, the DMRS allocation based on Tables 4 and 5 transmits the Information Element(s) indicating the allocated DMRS group and allocated DMRS port(s) through the physical layer control channel but not the Information Element 1 indicating DMRS resource size. Similar to the first exemplary embodiment of the present invention, the frequency-time resource for DMRS is determined according to the DMRS resource size. The UE assumes that the REs used in DMRS transmission or the REs designated by the indicated DMRS resource size are not used for PDSCH transmission to thereto.

Figure 9:
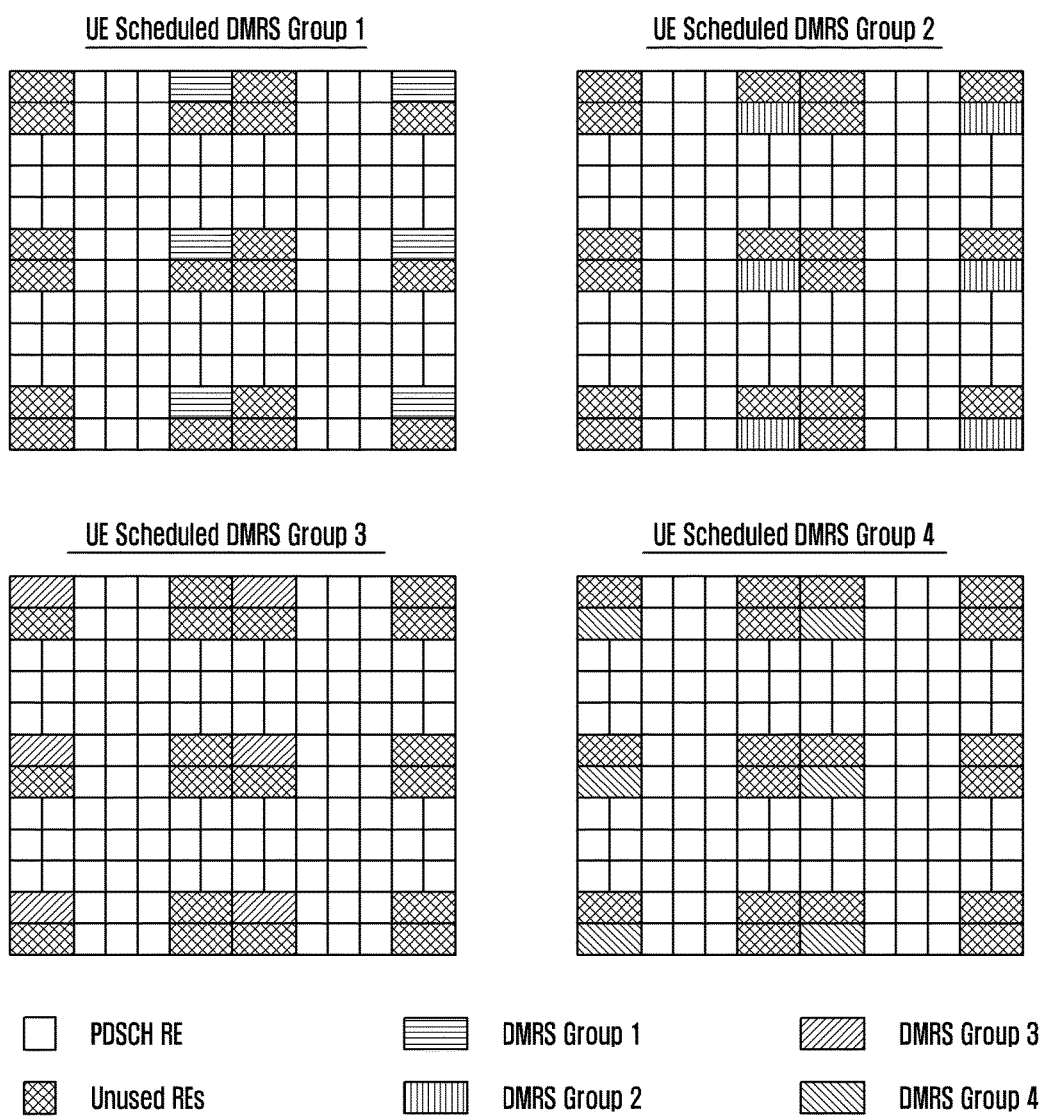
FIG. 9 is a diagram illustrating exemplary structures of an RB with Physical Downlink Shared Channel (PDSCH) and DMRS from a viewpoint of a UE in a transmission method according to an exemplary embodiment of the present invention.

FIG. 9 is a diagram illustrating exemplary structures of an RB with PDSCH and DMRS from a viewpoint of a UE in a transmission method according to an exemplary embodiment of the present invention.

Referring to FIG. 9, the UE is notified of the DMRS resource size of 4 through higher layer signaling. If one of DMRS groups 1, 2, 3, and 4 is assigned, the corresponding UE assumes that the remaining three DMRS groups are not used for PDSCH transmission. For example, if the UE is scheduled on the DMRS group 3 in FIG. 9, the UE assumes that the DMRS groups 1, 2, and 4 are not intended for PDSCH transmission to thereto regardless whether other terminals are scheduled assigned DMRS on these DMRS groups.

Figure 10:
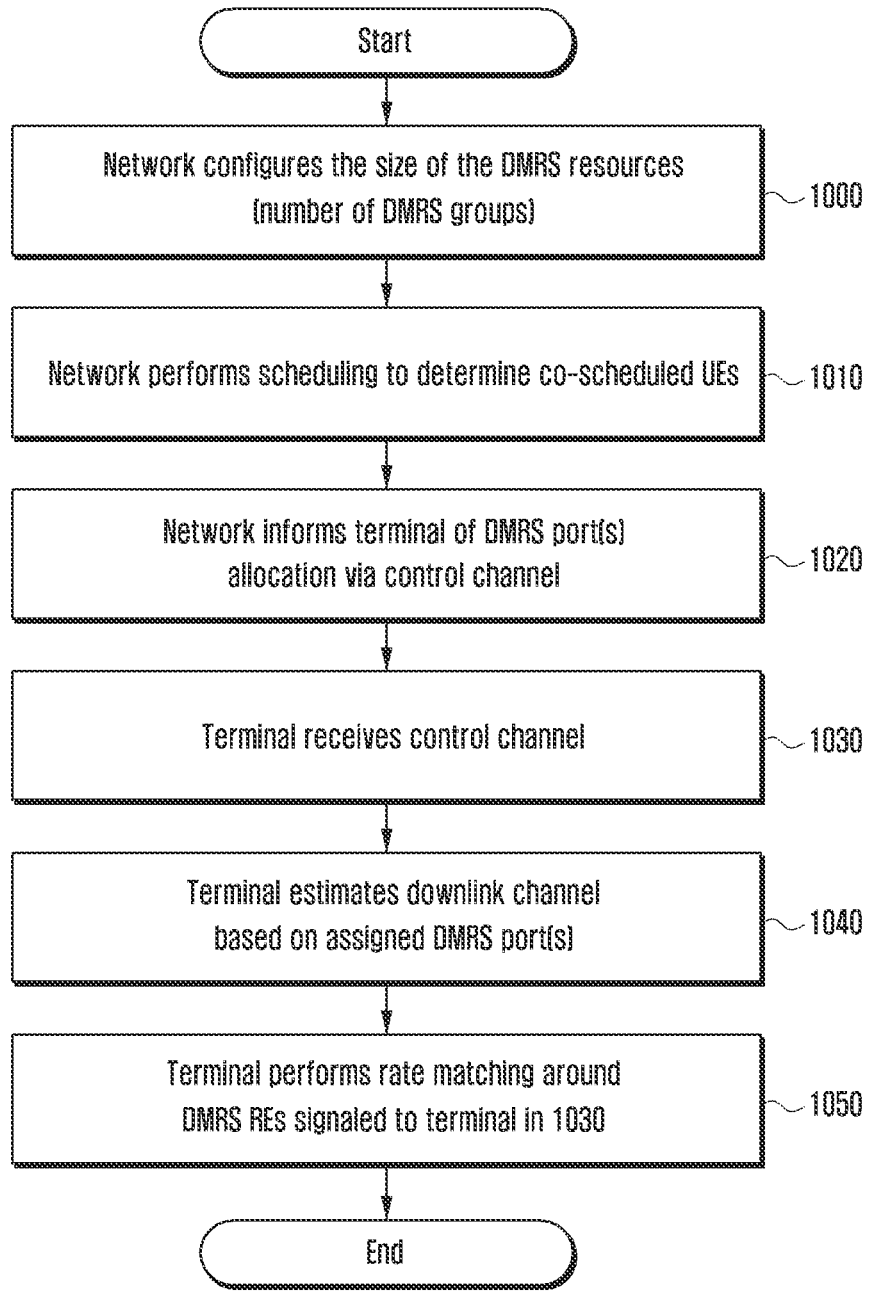
FIG. 10 is a flowchart illustrating a procedure of configuring DMRS resource size through higher layer signal from an eNB to a UE and allocating DMRS group and DMRS port(s) based on a configuration in a transmission method according to the second exemplary embodiment of the present invention.

FIG. 10 is a flowchart illustrating a procedure of configuring DMRS resource size through higher layer signal from an eNB to a UE and allocating DMRS group and DMRS port(s) based on a configuration in a transmission method according to the second exemplary embodiment of the present invention.

The second exemplary embodiment of the present invention illustrated in FIG. 10 differs from the first exemplary embodiment of the present invention illustrated in FIG. 7 in that the procedure is performed in the order of determining the DMRS resource size at the eNB, notifying the UE of the DMRS size, configuring the DMRS size to the UE, and scheduling the UE in FIG. 10 while the DMRS size is notified to the UE after scheduling the UE in FIG. 7. For example, the UE is configured with the DMRS resource size notified through higher layer scheduling and receives the DMRS group and port allocation information from the eNB on PDCCH or E-PDCCH.

At step 1000, the network configures the size of the DMRS resources (e.g., number of DMRS groups). For example, the eNB configures the size of the DMRS resources.

At step 1010, the network performs scheduling to determine co-scheduled UEs. For example, the eNB performs the scheduling to determine the co-scheduled UEs.

At step 1020, the network notifies the UE of DMRS port(s) allocated thereto via a control channel. For example, the DMRS allocation information is transmitted to the co-scheduled UEs. The eNB may transmit the DMRS allocation (e.g., the DMRS port(s) allocated to the UE) through PDCCH or E-PDCCH for physical layer control signal transmission in LTE/LTE-A.

At step 1030, the UE receives the control channel. For example, each UE receives the PDCCH or E-PDCCH transmitted by the eNB and determines the DMRS allocation information addressed thereto.

At step 1040, the UE estimates a DL channel based on assigned DMRS port(s).

At step 1050, the UE performs rate matching around DMRS REs signaled to the UE. For example, the UE determines the REs to which the PDSCH addressed thereto is mapped and receives the PDSCH thereon.

In the case of the second exemplary embodiment of the present invention, the UE has no DMRS resource configuration information at the time initiating communication with a specific eNB and thus there may be the time duration with uncertainty on how to assume the DMRS resource size. For example, the UE receives the DMRS resource size configuration from the eNB after notifying the eNB that it is the Massive MIMO and supports DMRS structure as shown in FIG. 4. If the UE does not know the DMRS resource size before receiving the initial DMRS resource size configuration from the eNB, this causes a problem.

In order to avoid such a problem, an exemplary embodiment of the present invention proposes an approach to determine a constant value specified in the mobile communication standard as the DMRS resource size. This method is advantageous in handover procedure for a certain UE to move from one cell to another.

Figure 11:
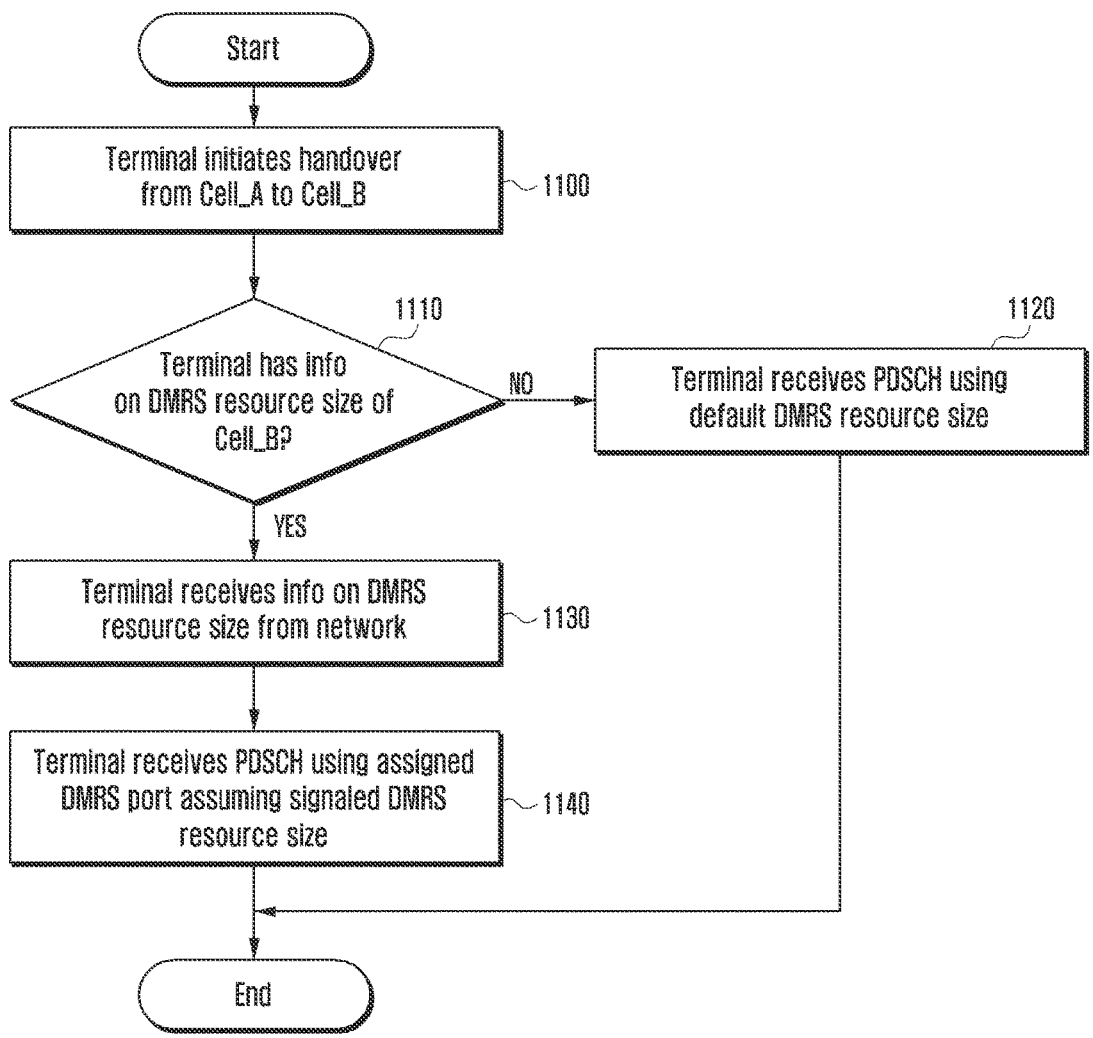
FIG. 11 is a flowchart illustrating a procedure of determining a constant value specified in a mobile communication standard as a DMRS resource size in a transmission method according to an exemplary embodiment of the present invention.

FIG. 11 is a flowchart illustrating a procedure of determining a constant value specified in a mobile communication standard as a DMRS resource size in a transmission method according to an exemplary embodiment of the present invention.

Referring to FIG. 11, the UE initiates handover from cell A to cell B at step 1100. At this time, the UE takes action differently depending on whether the UE has the information on the DMRS resource size of the cell B.

At step 1110, the UE determines whether the UE has information on the DMRS resource size of the cell B.

If the UE determines that that the UE has not yet received the DMRS resource size configuration information of cell B at step 1110, the UE proceeds to step 1120 at which the UE assumes the constant value specified in the standard as the DMRS resource size and receives the DMRS group and DMRS port(s) allocation information to receive PDSCH. Thereafter the UE ends the process.

Otherwise, if the UE determines that the UE has received the DMRS resource configuration information of cell B through higher layer signaling at step 1110, the UE proceeds to step 1130 at which the UE configures the DMRS resource size as signaled and receives the allocated DMRS group and DMRS port(s) information based on the DMRS resource size. Thereafter, the UE proceeds to step 1140 at which the UE receives PDSCH using the assigned DMRS port(s) based on the signaled DMRS resource size.

In the DMRS allocation information notification procedure according to the third exemplary embodiment of the present invention, the UE which has received the DMRS allocation information assumes that there is no PDCCH transmission addressed thereto on the radio resource with the exception of the DMRS group allocated thereto.

Figure 12:
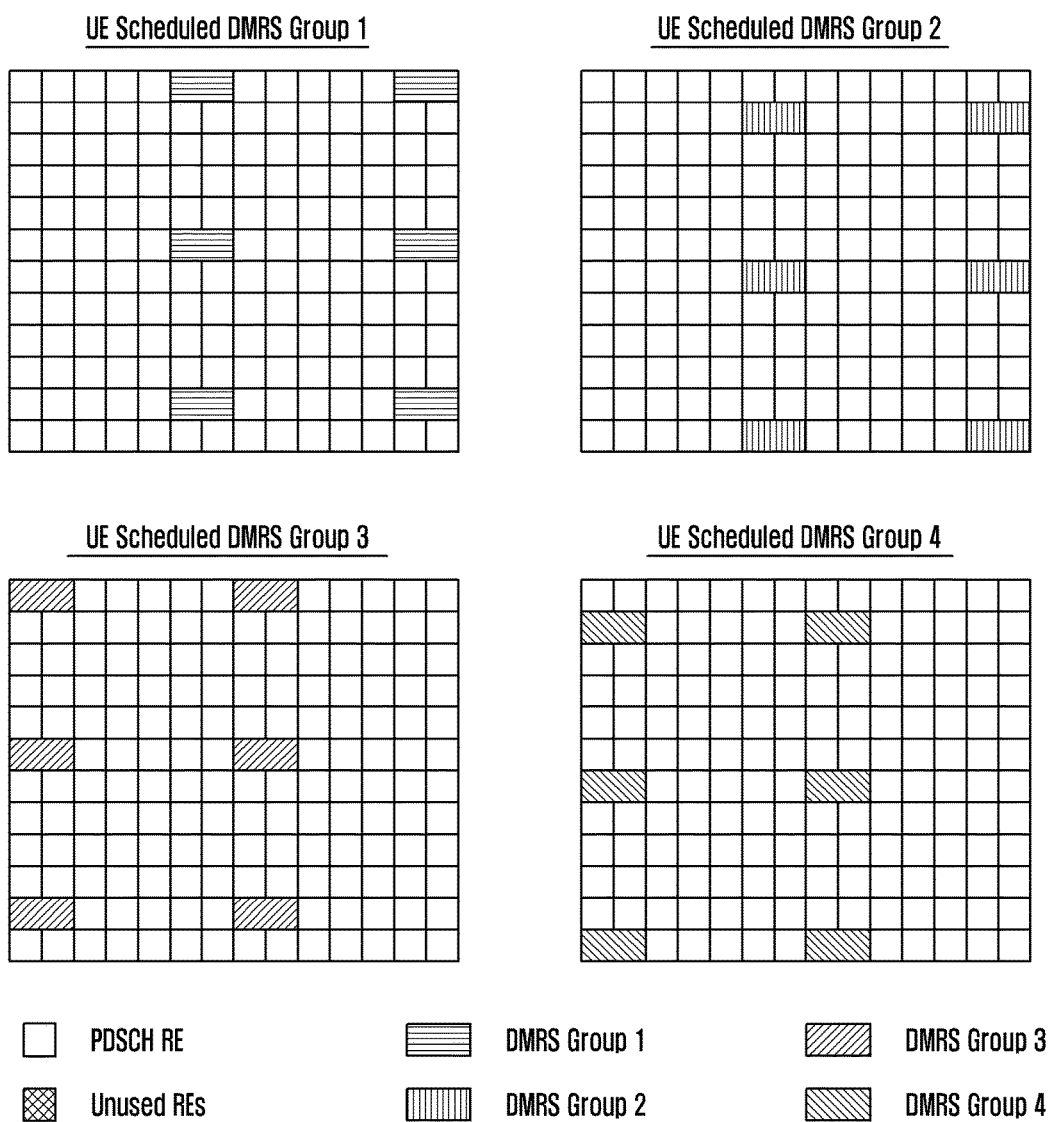
FIG. 12 is a diagram illustrating exemplary structures of an RB with DMRS for use in a transmission method according to an exemplary embodiment of the present invention.

FIG. 12 is a diagram illustrating exemplary structures of an RB with DMRS for use in a transmission method according to an exemplary embodiment of the present invention.

Referring to FIG. 12, the four RBs with respective DMRS group 1, DMRS group 2, DMRS group 3, and DMRS group 4 are provided. The UE is notified which DMRS group is allocated thereto through physical layer control channel or higher layer signaling. The UE assumes that only the DMRS group allocated thereto is used for DMRS transmission and the radio resource corresponding to other DMRS groups is used for its PDSCH. In the case of allocating a DMRS group with the physical layer control signal, the UE receives the DMRS group allocation control signal and the DMRS port allocation control signal from the eNB through physical layer signaling. In the case of transmitting the DMRS group allocation control information to the UE through higher layer signaling, the UE receives only the DMRS port allocation control signal using the physical layer control signal.

In the third exemplary embodiment of the present invention, the UE assumes that the DMRS resource is constant. As illustrated in FIG. 12, the UE assumes that the radio resource corresponding to only the one DMRS group allocated to it is used for DMRS transmission.

According to exemplary embodiments of the present invention, there are advantages associated with improve the system performance of the massive MIMO system by supporting plural DMRS ports as shown in FIG. 4. In this case, however, the DMRS-related downlink overhead is in proportion to the number of DMRS ports. For example, as the number of orthogonal DMRS ports increases, using more downlink radio resource for the orthogonal DMRS ports may be necessary. Because the DMRS and PDSCH are implemented in the set of the same radio resource, if more radio resources are used for DMRS transmission, the radio resource for use in PDSCH transmission is reduced.

In order to overcome the DMRS overhead-related problems, exemplary embodiments of the present invention propose a structure in which the DMRS density is adjusted according to the number of consecutive RBs allocated to the UE in the frequency domain. The DMRS density denotes the number of REs used for transmitting a DMRS port within one RB. For example, as illustrated in FIG. 4, a DMRS port is transmitted using total 12 REs per RB. The DMRS density is 12 REs/RB in the example illustrated in FIG. 4.

The resource configuration proposed in exemplary embodiments of the present invention may determine the DMRS density depending on whether the PDSCH transmitted to the UE is mapped to K or more consecutive RBs within a subframe in the frequency domain. For example, according to exemplary embodiments of the present invention, K can be set to a certain value.

If the PDSCH is transmitted on K or more consecutive RBs in the frequency domain, the UE and the eNB assume a low DMRS density. Otherwise, if the PDSCH is transmitted on a number of the RBs less than K, the DMRS density is assumed low.

Figure 13:
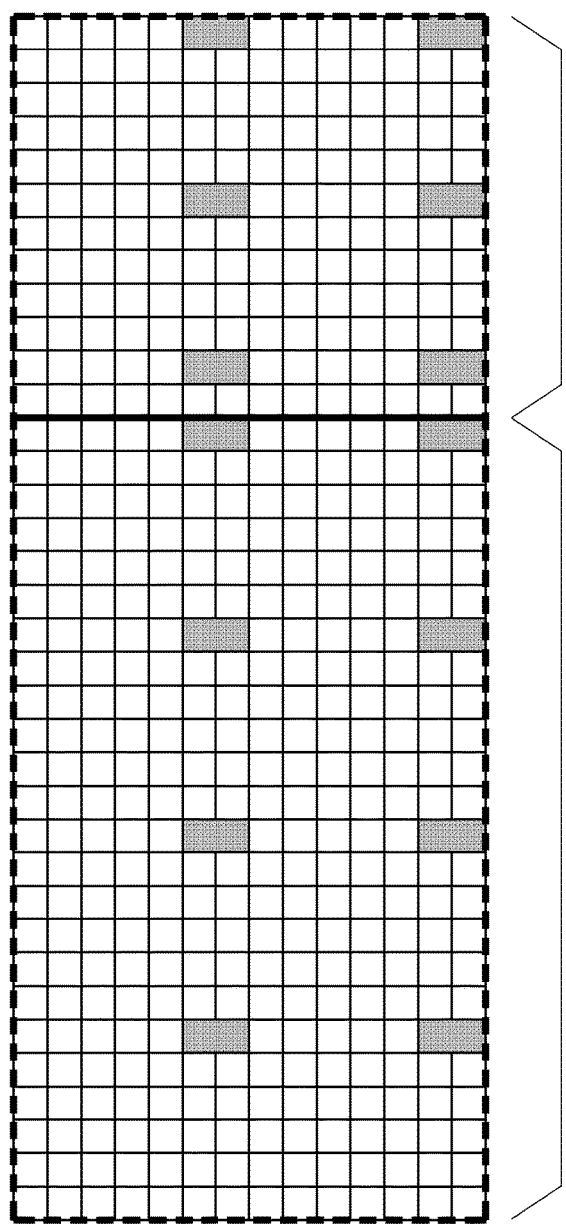
FIG. 13 is a diagram illustrating resources with DMRSs for explaining DMRS density depending on frequency resources allocated consecutively in a transmission method according to an exemplary embodiment of the present invention.

FIG. 13 is a diagram illustrating resources with DMRSs for explaining DMRS density depending on frequency resources allocated consecutively in a transmission method according to an exemplary embodiment of the present invention.

Referring to FIG. 13, the number of consecutive RBs allocated to the UE is assumed to be equal to or greater than K=2. As illustrated in FIG. 13, the PDSCH addressed to the UE 1 is transmitted on only the first RB. Meanwhile, the PDSCH addressed to the UE 2 is transmitted two consecutive RBs (e.g., the second and third RBs). Accordingly, if the adaptive DMRS density determination method proposed in exemplary embodiments of the present invention is applied, the DMRS for PDSCH addressed to the UE 1 is transmitted with 12 REs per RB while the DMRS for PDSCH addressed to the UE 2 is transmitted with 8 REs per RB.

If the PDSCH is transmitted on the consecutive RBs as described above, reducing the DMRS density may be possible because the consecutive RB undergo similar radio channel and thus channel estimation on an RB can be performed using DMRSs of adjacent RBs. According to the exemplary embodiment of the present invention illustrated in FIG. 13, similar channel estimation performances are expected in the following two cases:

Single RB assignment with high DMRS density; and
Multiple consecutive RBs assignment with low DMRS density.

In an LTE communication system, when transmitting PDSCH to a UE, allocating the RBs on multiple frequency regions may be possible. In this case, the DMRS density can be determined based on the number of consecutive RBs in the frequency domain.

Figure 14:
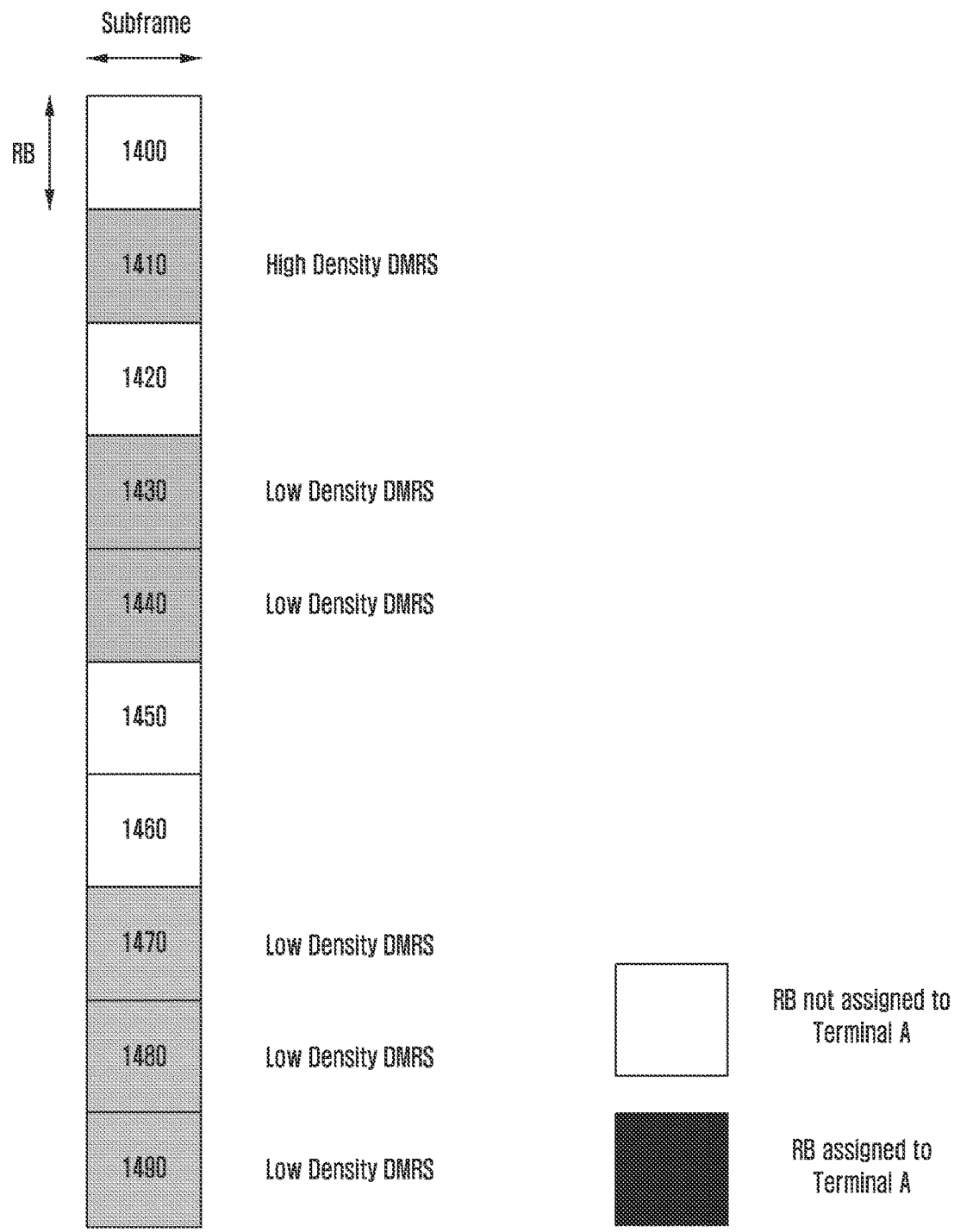
FIG. 14 is a diagram illustrating a subframe with multiple frequency regions carrying Physical Downlink Control Channel (PDCCH) addressed to a UE in a transmission method according to an exemplary embodiment of the present invention.

FIG. 14 is a diagram illustrating a subframe with multiple frequency regions carrying PDCCH addressed to a UE in a transmission method according to an exemplary embodiment of the present invention.

Referring to FIG. 14, the DMRS density is assumed to be reduced with K=2 or more consecutive RBs allocated to the UE in the frequency domain.

As illustrated in FIG. 14, the UE receives the PDSCH on the RBs 1410, 1430, 1440, 1470, 1480, and 1490. At this time, the eNB and the UE assume high DMRS density to the RBs allocated not consecutively as the RB 1410. In contrast, the UE assumes low DMRS density to the consecutive RBs such as RBs 1430 and 1440. Likewise, because the RBs 1470, 1480, and 1490 are consecutive allocations, the UE assumes low DMRS density to these three consecutive RBs.

In addition to the number of RBs allocated consecutively as shown in FIG. 14, the DMRS density can be determined based on whether the consecutive RBs are included in a predetermined region.

Figure 15:
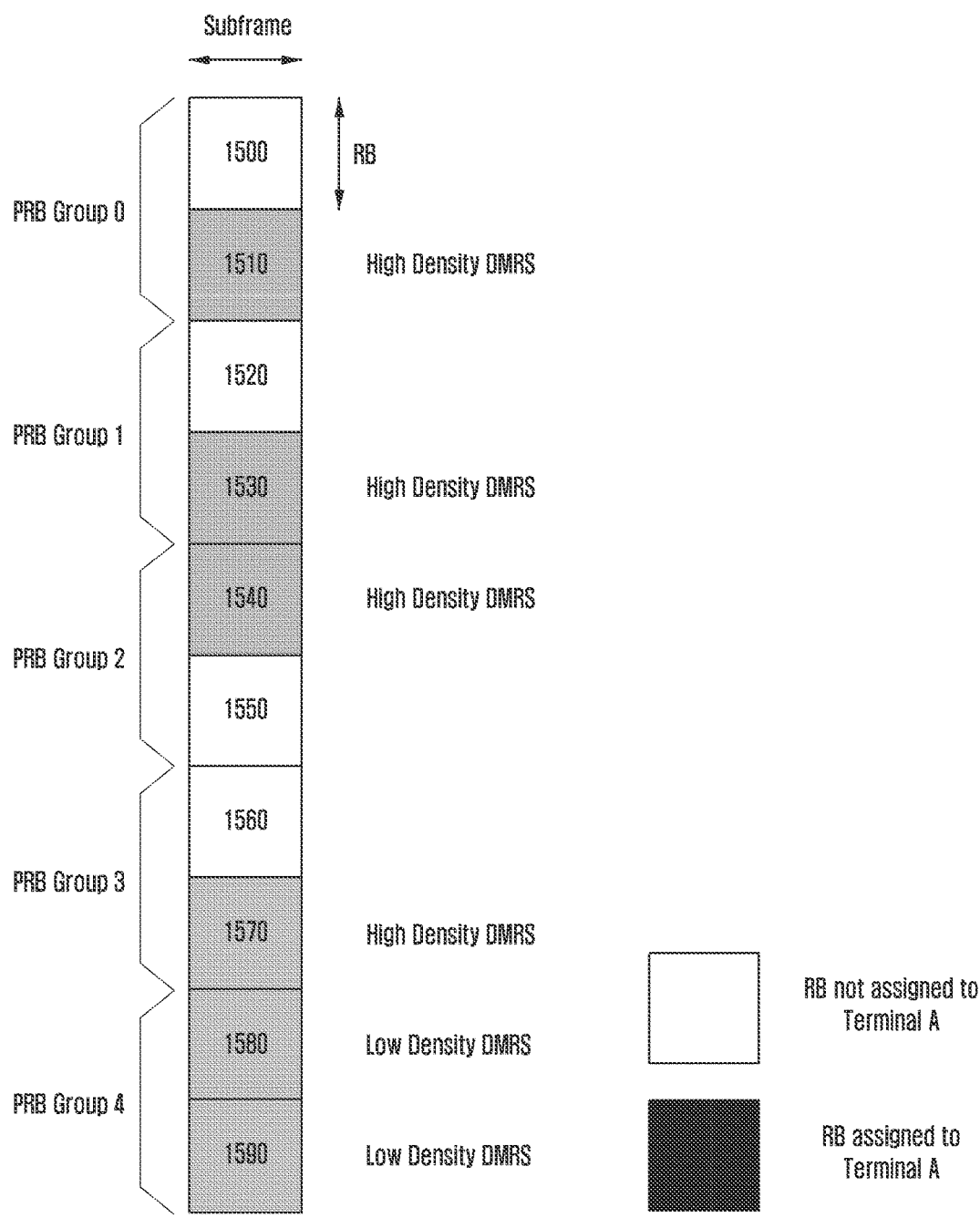
FIG. 15 is a diagram illustrating a subframe with multiple frequency regions carrying PDCCH addressed to a UE in a transmission method according to an exemplary embodiment of the present invention.

FIG. 15 is a diagram illustrating a subframe with multiple frequency regions carrying PDCCH addressed to a UE in a transmission method according to another exemplary embodiment of the present invention.

Referring to FIG. 15, according to the exemplary embodiment of the present invention, the eNB and the UE determine the DMRS density based on whether the consecutive RBs are included in a specific region as well as the number of consecutively allocated RBs.

As illustrated in FIG. 15, a PRB group is a set of a predetermined number of RBs and, in the case of an LTE system, the PRB group is determined according to the system bandwidth. In an exemplary embodiment of the present invention, the low DMRS density is applied when the following condition is fulfilled and, otherwise, the high DMRS density as depicted in FIG. 15:

K or more consecutive RBs are allocated and the K or more consecutive RBs include all RBs included in a PRB group.

In the exemplary embodiment of the present invention illustrated in FIG. 15, if the DMRS density is determined in unit of PRB group and if the RBs allocated to the UE consecutively include all RBs included in a specific PRB group, the low DMRS density is applied.

Assuming K=2 and PRB group as shown in FIG. 15, the high DMRS density is applied to the RBs 1530 and 1540 unlike the case of FIG. 14 in which the lower DMRS density is applied to the RBs 1530 and 1540. In the case of RB 1570, because the consecutive RBs 1570, 1580, and 1590 are not included in the same PRB group, the high DMRS density is applied to the RB 1570. In contrast, the two consecutive RBs 1580 and 1590 is included in the PRB group 4, the low DMRS density is applied.

Figure 16:
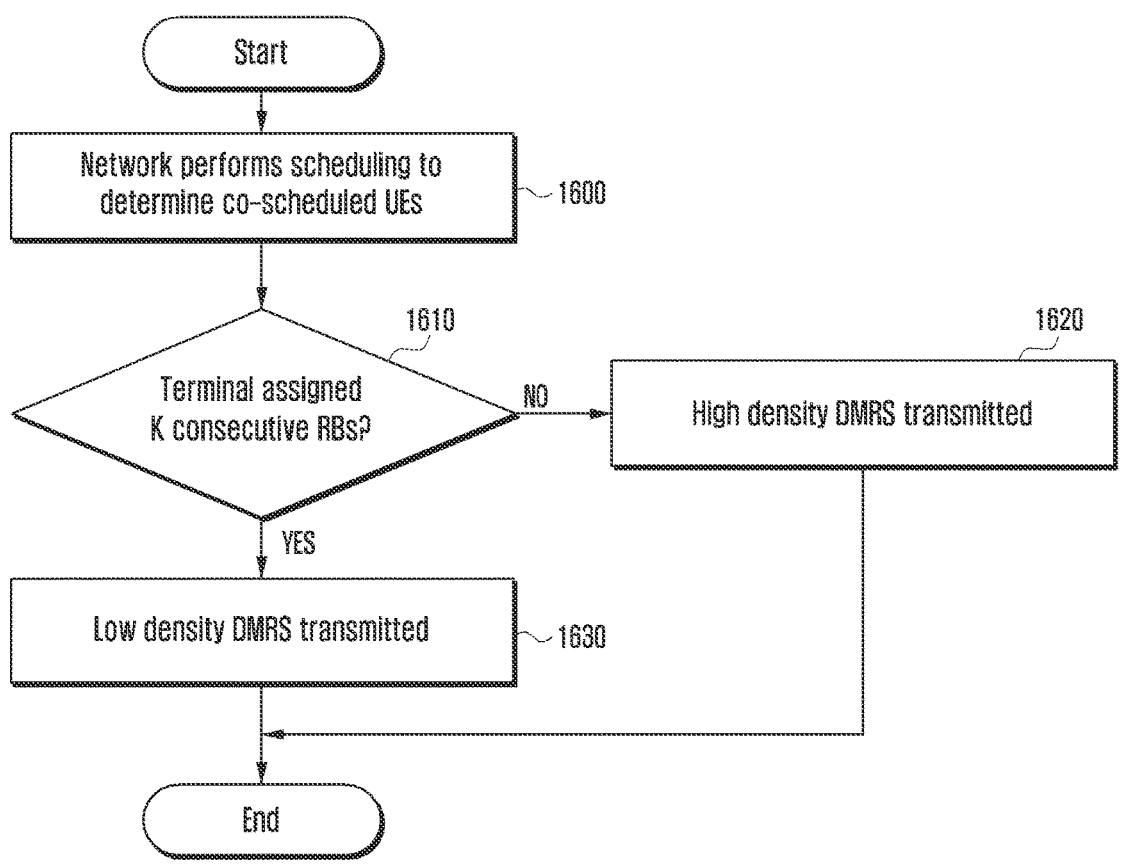
FIG. 16 is a flowchart illustrating an eNB's adaptive DMRS density determination procedure of a transmission method according to an exemplary embodiment of the present invention.

FIG. 16 is a flowchart illustrating an eNB's adaptive DMRS density determination procedure of a transmission method according to an exemplary embodiment of the present invention.

Referring to FIG. 16, the eNB's adaptive DMRS density determination procedure is illustrated under the assumption that when K or more consecutive RBs are allocated to the UE low density DMRS is transmitted to the UE. K can be set to 2 as in the above-described exemplary embodiment of the present invention or another value.

As illustrated in FIG. 16, the eNB performs scheduling to allocate a frequency resource to a UE at step 1600. For example, the eNB performs scheduling to determine the co-scheduled UEs. According to the scheduling result at step 1600, the eNB determines whether to configure the DMRS density of the UE depending on whether K or more consecutive RBs are allocated to the UE at step 1610. For example, if the eNB determines that a UE is not assigned K consecutive RBs at step 1610, then the eNB proceeds to step 1620 at which the eNB transmits high density DMRS to the UE. Thereafter, the eNB ends the process. In contrast, if the eNB determines that K or more consecutive RBs are allocated to the UE, the eNB proceeds to step 1630 at which the eNB transmits low density DMRS to the UE within the corresponding frequency region at step 1630.

Figure 17:
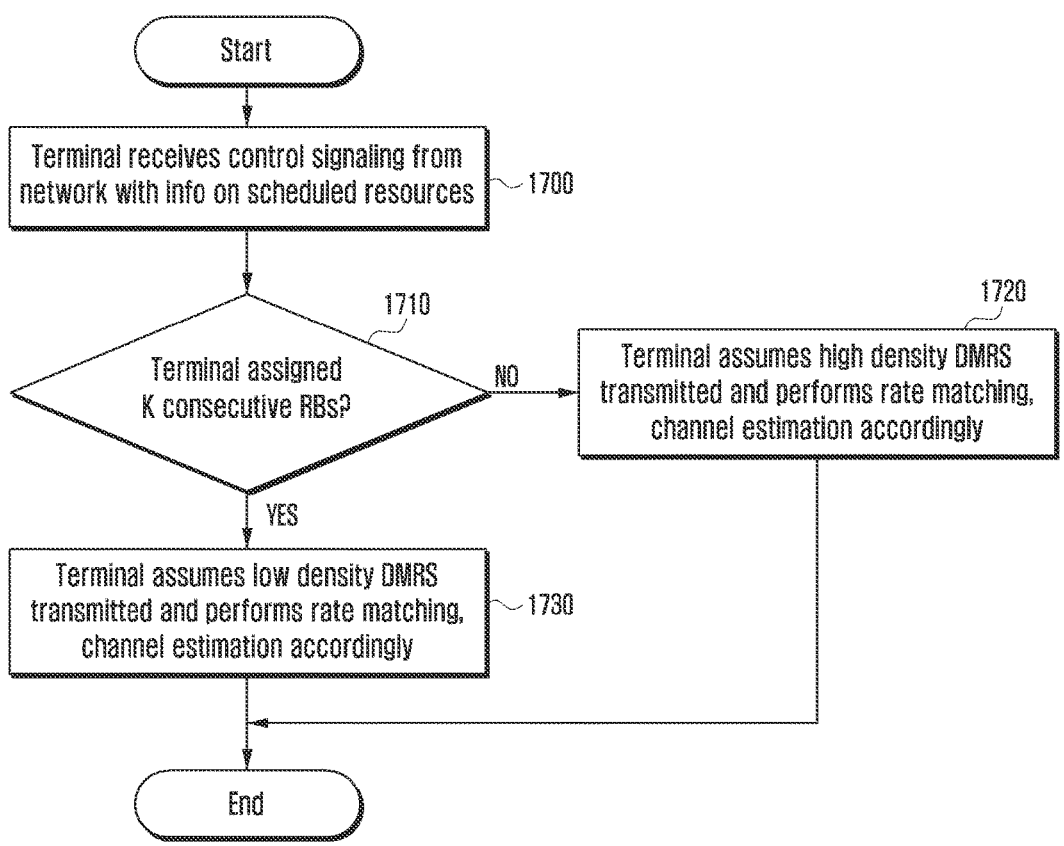
FIG. 17 is a flowchart illustrating a UE's adaptive DMRS density determination procedure of a transmission method according to an exemplary embodiment of the present invention.

FIG. 17 is a flowchart illustrating a UE's adaptive DMRS density determination procedure of a transmission method according to an exemplary embodiment of the present invention.

Referring to FIG. 17, the UE's adaptive DMRS density determination procedure is illustrated under the assumption that when K or more consecutive RBs are allocated to the UE low density DMRS is transmitted to the UE.

As illustrated in FIG. 17, the UE receives the control channel (e.g., PDCCH or E-PDCCH) from the eNB and determines the downlink frequency resource on which the PDSCH is transmitted at step 1700.

Thereafter, the UE determines whether the DMRS allocated thereto is low density DMRS or high density DMRS based on the frequency resource allocated thereto at step 1710. For example, at step 1710, the UE determines whether the UE is assigned K consecutive RBs.

If the UE determines that the number of consecutive RBs allocated to the UE is less than K at step 1710, then the UE proceeds to step 1720 at which the UE performs channel estimation under the assumption that high density DMRS is transmitted. Thereafter, the UE ends the process. In contrast, if the UE determines that K or more consecutive RBs are allocated to the UE at step 1710, then the UE proceeds to step 1730 at which the UE performs channel estimation under the assumption that the low density DMRS is transmitted in the corresponding frequency region at step 1730.

Figure 18:
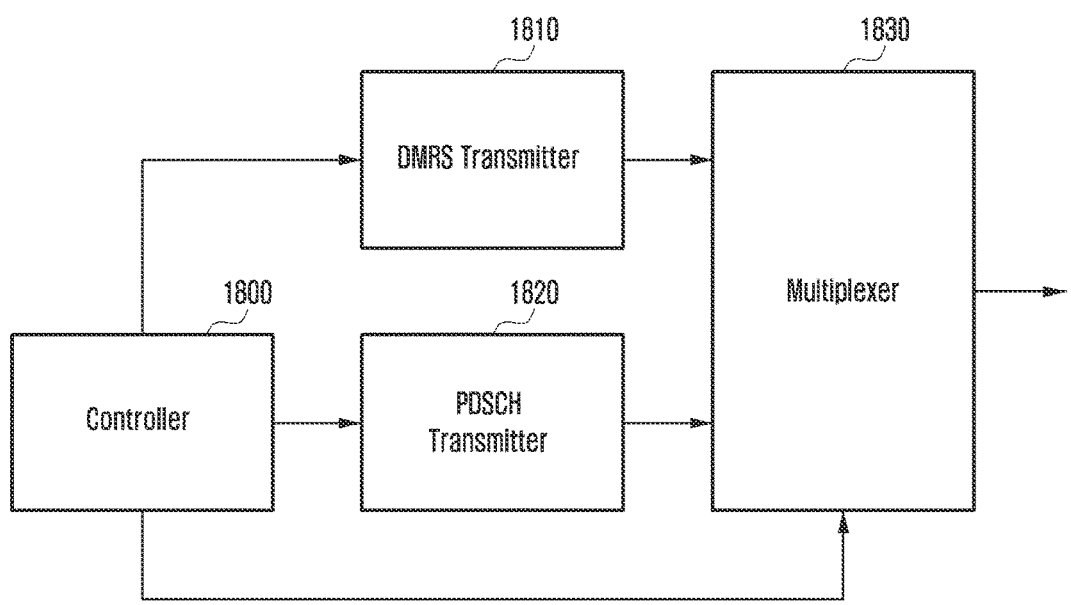
FIG. 18 is a block diagram illustrating a configuration of an eNB apparatus according to an exemplary embodiment of the present invention.

FIG. 18 is a block diagram illustrating a configuration of an eNB apparatus according to an exemplary embodiment of the present invention.

Referring to FIG. 18, the eNB may include a controller 1800, a DMRS transmitter 1820, a PDSCH transmitter 1820, and the multiplexer 1830.

The controller 1800 performs scheduling to assign the frequency resources for PDSCH transmission to UEs. The scheduling can be performed at every subframe. If the controller 1800 determines that a UE is to receive PDSCH, the DMRS transmitter 1810 generates DMRS for the scheduled UE.

The controller 1800 controls the DMRS transmitter 1810 to generate DMRS based on the number of orthogonal DMRS ports, the number of DMRS resource sizes, DMRS group per UE, and DMRS port(s) per UE in consideration of the number of co-scheduled UEs and the number of consecutive RBs allocated per UE. At this time, the PDSCH transmitter 1820 generates PDSCH, and the multiplexer 1830 multiplexes the DMRS and PDSCH, the multiplexed DMRS and PDSCH being transmitted to the UE.

Figure 19:
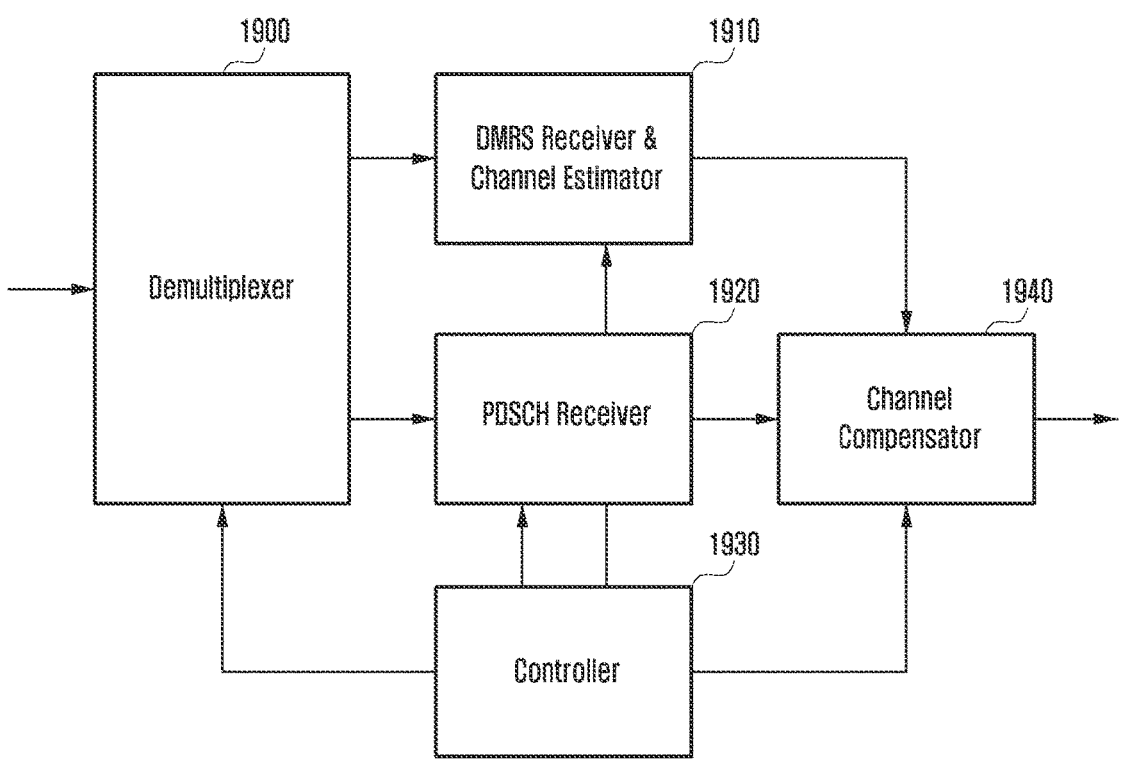
FIG. 19 is a block diagram illustrating a configuration of a UE apparatus according to an exemplary embodiment of the present invention.

FIG. 19 is a block diagram illustrating a configuration of a UE apparatus according to an exemplary embodiment of the present invention.

Referring to FIG. 19, the UE may include a demultiplexer 1900, a DMRS channel estimator 1910, a PDSCH receiver 1920, a controller 1930, and a channel compensator 1940.

The demultiplexer 1900 of the UE demultiplexes the signal received from the eNB. At this time, the controller 1930 controls the demultiplexer 1900 to demultiplex the received into DMRS and PDSCH based on the DMRS information received through PDCCH/E-PDCCH or higher layer signaling. For example, the controller 1930 demultiplexes the DMRS and PDSCH in consideration of the DMRS resource size, assigned DMRS group, assigned DMRS port, and DMRS density, the DMRS and PDSCH being input to the DMRS channel estimator 1910 and PDSCH receiver 1930 respectively.

The DMRS channel estimator 1910 performs channel estimation with the input DMRS to output a channel estimation value to the channel compensator 1940 to recover PDSCH.

As described above, the channel transmission/reception method and apparatus for use in the mobile communication system supporting Massive MIMO transmission is capable of increasing the number of UEs to be served simultaneously and the number of orthogonal DMRSs by securing extra resources for DMRS allocation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a base station in a mobile communication system supporting massive multiple input multiple output (MIMO), the method comprising:
   determining a demodulation reference signal (DMRS) which is allocated to a terminal, a resource of the DMRS being positioned in at least one of a first multi-symbol resource set and a second multi-symbol resource set symmetric with the first multi-symbol resource set on a time axis, such that an axis of symmetry is a center of a subframe;
   transmitting DMRS allocation information to the terminal; and
   transmitting the DMRS and data to the terminal,
   wherein the DMRS allocation information comprises a size of the DMRS resource capable of being allocated to the terminal, an allocated DMRS group, and at least one allocated DMRS antenna port within the allocated DMRS group,
   wherein the DMRS group is capable of being allocated to one of the first multi-symbol resource set and the second multi-symbol resource set,
   wherein the terminal that is capable of determining a total amount of resources allocated for DMRS transmission based on the DMRS allocation information, and
   wherein a number of a resource element for a DMRS antenna port corresponding to the terminal is identified based on a number of consecutive resource blocks allocated to the terminal.

2. The method of claim 1, wherein the resource block includes at least one DMRS group and the at least one DMRS group of the resource block comprises up to 4 orthogonal DMRSs, and one DMRS group is formed by shifting another DMRS group on at least one of time and frequency axes.

3. The method of claim 1, wherein the DMRS allocation information is transmitted through one of a physical layer signaling and a higher layer signaling.

4. A method of a terminal in a mobile communication system supporting massive multiple input multiple output (MIMO), the method comprising:
   receiving demodulation reference signal (DMRS) allocation information from a base station;
   identifying a DMRS which is allocated to the terminal based on the DMRS allocation information, a resource of the DMRS being positioned in at least one of a first multi-symbol resource set and a second multi-symbol resource set symmetric with the first multi-symbol resource set on a time axis, such that an axis of symmetry is a center of a subframe; and
   receiving the DMRS and data from the base station based on the DMRS allocation information,
   wherein the DMRS allocation information comprises a size of the DMRS resource capable of being allocated to the terminal, an allocated DMRS group, and at least one allocated DMRS antenna port within the allocated DMRS group,
   wherein the DMRS group is capable of being allocated to one of the first multi-symbol resource set and the second multi-symbol resource set,
   wherein the terminal is capable of determining a total amount of resources allocated for DMRS transmission based on the DMRS allocation information, and
   wherein a number of a resource element for a DMRS antenna port corresponding to the terminal is identified based on a number of consecutive resource blocks allocated to the terminal.

5. The method of claim 4, wherein the resource block includes at least one DMRS group and the at least one DMRS group of the resource block comprises up to 4 orthogonal DMRSs, and one DMRS group is formed by shifting another DMRS group on at least one of time and frequency axes.

6. The method of claim 4,
wherein the DMRS allocation information is transmitted through physical layer signaling, and
wherein the terminal assumes that the DMRS resource capable of being allocated to the terminal, with exception of a resource for the DMRS group allocated to the terminal, is not used for DMRS and data transmission.

7. The method of claim 4,
wherein the terminal is notified of the DMRS resource size through higher layer signaling,
wherein the terminal is notified of the allocated DMRS group and allocated DMRS antenna port through physical layer signaling, and
wherein the terminal receives the data on the resource with exception of the DMRS resource capable of being allocated for DMRS.

8. The method of claim 4, further comprising receiving the data on a resource with exception of a resource for the allocated DMRS group determined based on the DMRS allocation information within the resource block.

9. An apparatus of a base station in a mobile communication system supporting massive multiple input multiple output (MIMO), the apparatus comprising:
a transceiver configured to transmit and receive signals and data to and from a terminal; and
a controller configured to:
control to determine a demodulation reference signal (DMRS) which is allocated to a terminal, a resource of the DMRS being positioned in at least one of a first multi-symbol resource set and a second multi-symbol resource set symmetric with the first multi-symbol resource set on a time axis, such that an axis of symmetry is a center of a subframe,
transmit DMRS allocation information to the terminal, and
transmit the DMRS and data to the terminal,
wherein the DMRS allocation information comprises a size of the DMRS resource capable of being allocated to the terminal, an allocated DMRS group, and at least one allocated DMRS antenna port within the allocated DMRS group,
wherein the DMRS group is capable of being allocated to one of the first multi-symbol resource set and the second multi-symbol resource set,
wherein the terminal is capable of determining a total amount of resources allocated for DMRS transmission based on DMRS resources information included in the DMRS allocation information, and
wherein a number of a resource element for a DMRS antenna port corresponding to the terminal is identified based on a number of consecutive resource blocks allocated to the terminal.

10. The apparatus of claim 9, wherein the resource block includes at least one DMRS group and the at least one DMRS group of the resource block comprises up to 4 orthogonal DMRSs, and one DMRS group is formed by shifting another DMRS group on at least one of time and frequency axes.

11. The apparatus of claim 9, wherein the DMRS allocation information is transmitted through one of a physical layer signaling and a higher layer signaling.

12. An apparatus of a terminal in a mobile communication system supporting massive multiple input multiple output (MIMO), the apparatus comprising:
a transceiver configured to transmit and receive signals and data to and from a base station; and
a controller configured to:
control to receive demodulation reference signal (DMRS) allocation information from a base station,
identify a DMRS which is allocated to the terminal based on the DMRS allocation information, a resource of the DMRS being positioned in at least one of a first multi-symbol resource set and a second multi-symbol resource set symmetric with the first multi-symbol resource set on a time axis, such that an axis of symmetry is a center of a subframe, and
receive the DMRS and data from the base station based on the DMRS allocation information,
wherein the DMRS allocation information comprises a size of the DMRS resource capable of being allocated to the terminal, an allocated DMRS group, and at least one allocated DMRS antenna port within the allocated DMRS group,
wherein the DMRS group is capable of being allocated to one of the first multi-symbol resource set and the second multi-symbol resource set,
wherein the terminal is capable of determining a total amount of resources allocated for DMRS transmission based on the DMRS allocation information, and
wherein a number of a resource element for a DMRS antenna port corresponding to the terminal is identified based on a number of consecutive resource blocks allocated to the terminal.

13. The apparatus of claim 12, wherein the resource block includes at least one DMRS group and the at least one DMRS group of the resource block comprises up to 4 orthogonal DMRSs, and one DMRS group is formed by shifting another DMRS group on at least one of time and frequency axes.

14. The apparatus of claim 12,
wherein the DMRS allocation information is transmitted through physical layer signaling, and
wherein the terminal assumes that the DMRS resource capable of being allocated to the terminal, with exception of a resource for the DMRS group allocated to the terminal, is not used for DMRS and data transmission.

15. The apparatus of claim 12,
wherein terminal is notified of the DMRS resource size through higher layer signaling,
wherein the terminal is notified of the allocated DMRS group and allocated DMRS antenna port through physical layer signaling, and
wherein the terminal receives the data on the DMRS resource with exception of the DMRS resource capable of being allocated for DMRS.

16. The apparatus of claim 12, wherein the controller controls receiving the data on a resource with exception of a resource for the allocated DMRS group determined based on the DMRS allocation information within the resource block.

* * * * *